US00RE42386E

(19) United States
(12) Reissued Patent
Wanie

(10) Patent Number: US RE42,386 E
(45) Date of Reissued Patent: May 24, 2011

(54) WATER SOFTENER MONITORING SYSTEM

(76) Inventor: Andrew J. Wanie, Jackson, WI (US)

(21) Appl. No.: 12/775,076

(22) Filed: May 6, 2010

Related U.S. Patent Documents

Reissue of:
(64) Patent No.: 7,369,055
Issued: May 6, 2008
Appl. No.: 11/388,448
Filed: Mar. 24, 2006

U.S. Applications:
(63) Continuation-in-part of application No. 10/675,641, filed on Sep. 30, 2003, now Pat. No. 7,030,768.

(51) Int. Cl.
*G08B 21/00* (2006.01)
*G01F 23/26* (2006.01)
*H01H 35/00* (2006.01)

(52) U.S. Cl. ..... 340/618; 340/612; 73/304 C; 200/61.21

(58) Field of Classification Search ..... 398/106–108, 398/115–117, 140, 151; 200/61.2, 61.21; 340/607, 608, 612, 617, 618, 619, 621; 73/290 R, 73/304 C, 293
See application file for complete search history.

(56) References Cited

U.S. PATENT DOCUMENTS 3,890,486 A * 6/1975 Fitzgerald ..... 219/523
4,307,606 A * 12/1981 Johnson ..... 73/295
4,332,678 A 6/1982 Spiegl
4,774,838 A * 10/1988 Rickson et al. ..... 73/295
4,986,902 A 1/1991 Serna
4,987,409 A 1/1991 Jackson
5,132,669 A 7/1992 Jackson
5,147,531 A 9/1992 Dougal
5,239,205 A 8/1993 Hoffman et al.
5,239,285 A 8/1993 Rak
5,264,831 A * 11/1993 Pfeiffer ..... 340/621
5,297,428 A 3/1994 Carr et al.
5,340,954 A 8/1994 Hoffman et al.
5,363,087 A * 11/1994 Johannsen et al. ..... 340/612
5,512,834 A 4/1996 McEwan
5,665,895 A * 9/1997 Hart et al. ..... 73/1.73
5,818,128 A 10/1998 Hoffman et al.
6,023,159 A 2/2000 Heger
6,067,927 A * 5/2000 Johnson et al. ..... 116/227
6,107,924 A * 8/2000 Kasai et al. ..... 340/627
6,188,228 B1 2/2001 Philipp
6,192,693 B1 2/2001 Kloppenberg et al.
6,218,949 B1 * 4/2001 Issachar ..... 340/624
6,281,802 B1 8/2001 Venable et al.
6,287,458 B1 9/2001 Lawrence
6,309,551 B1 10/2001 Suchecki, Jr. et al.
6,456,202 B2 9/2002 Johannsen et al.
6,536,276 B2 * 3/2003 Huss et al. ..... 73/295

(Continued)

*Primary Examiner* — Jennifer Mehmood
(74) *Attorney, Agent, or Firm* — Boyle Fredrickson, S.C.

(57) ABSTRACT

A system for monitoring the level or amount of a material within a container is provided. The system includes a detection mechanism that can be a direct detection mechanism or any of a number of indirect detection mechanisms. When the detection mechanism senses an upper level of the substance in the container that is below a predetermined lower limit for the substance, the mechanism operates an alarm mechanism to emit an audible and/or visible alarm to alert an individual to the low level of the substance within the container. The alarm mechanism can be integrally formed with the detection mechanism, or can be spaced from the detection mechanism in order to provide a more accessible point for the viewing or hearing of the alarm emitted by the alarm mechanism.

17 Claims, 30 Drawing Sheets

U.S. PATENT DOCUMENTS 6,964,278 B2 * 11/2005 Tschanz ..... 137/392
6,983,214 B2 * 1/2006 Hiraizumi et al. ..... 702/100
7,127,943 B1 * 10/2006 Griffiths et al. ..... 73/304 C
7,284,427 B2 * 10/2007 Calabrese ..... 73/304 R
2001/0054966 A1 12/2001 Johannsen et al.
2002/0149489 A1 10/2002 Bearak
2002/0170354 A1 * 11/2002 Monsrud et al. ..... 73/305
2007/0207053 A1 * 9/2007 Doyle et al. ..... 422/14

* cited by examiner

WATER SOFTENER MONITORING SYSTEM

Matter enclosed in heavy brackets [ ] appears in the original patent but forms no part of this reissue specification; matter printed in italics indicates the additions made by reissue.

REFERENCE TO RELATED APPLICATION

This application is a Continuation-in-part of U.S. Ser. No. 10/675,641 filed on Sep. 30, 2003 now U.S. Pat. No. 7,030, 768.

FIELD OF THE INVENTION

The present invention relates generally to water softener salt tanks, and more specifically to a system which continuously monitors the level of the salt contained within and activates an alarm when an unacceptably low level of salt is reached within the tank.

BACKGROUND OF THE INVENTION

Water softeners are used to soften hard water prior to the water being utilized by an individual. The water softener includes a salt tank through which water and salt form a brine solution.

During operation of the water softener, the salt contained in the water softener salt tank is used up over time, such that the salt needs to be replenished in order to maintain the effectiveness of the water softener. However, due to the normal placement of water softeners within a home, i.e., often in a basement in the well pump room, and the opaque materials utilized to form the tanks in which the salt is contained, many times the salt in the water softener salt tank is unknowingly completely exhausted, such that it can no longer form a brine solution and that water used thereafter by an individual is "hard."

Running out a brine tank of salt causes hard water to pass through the hot water heater causing build up of sediment in the tank, along with causing unwanted characteristics in the water such as hardness on the skin, and poor lathering and cleaning of soaps and detergents. Most users of water softeners have let their brine tanks run out of salt due to the poor visual signs of low salt in the tank, and due to the fact that the tanks are usually placed in a location that is infrequently seen or visited such as the basement or closet.

To remedy this problem, a number of different monitoring devices for water softener salt tanks have been developed. The majority of these mechanisms involve a number of interacting parts which, when the salt reaches a predetermined lower limit in the tank, operate to provide some type of indication to a user that the salt in the water softener tank needs to be replenished.

While the majority of these devices are generally effective in providing an indication to an individual when salt in a water softener tank needs to be replenished, the costs for assembly and/or maintenance of these prior art monitoring devices are often high due to the large number of interacting or interconnected components of the devices which do not hold up well under the harsh conditions formed by the salt water present in the water softener tank. The devices are also cumbersome to install for the average user.

Therefore, it is desirable to develop a monitoring system for a water softener salt tank that is not constructed from a large number of parts, and that is capable of accurately determining the amount of salt remaining in the water softener salt tank, and is more easily installed outside the harsh environment of the tank. It is also desirable to develop a monitoring system which can be adapted for use with a variety of water softener tanks without requiring significant modifications.

What is therefore needed is a system that is easily installed, preferably attaches to the outside of the tank without the need for the drilling of any holes, and is configured to conform to various shapes and sizes of the tank. What is needed is a system that preferably includes smart software that can be easily programmable. What also is needed is a system that has a remote alarm that can be placed up to 100 feet away from the salt tank and is preferably battery operated with many years of life. What is needed is a system that is rugged and reliable and is also low-cost and preferably has different sensitivity depending on variables within the home and the tank itself. What is needed is a system that is self-calibrating and/or can be calibrated by the user and can be adjusted on a trial and error basis.

SUMMARY OF THE INVENTION

While there have been many means developed to sense substances inside containers, this invention relates to sensing salt, water, brine, and the combinations of each along with the unique problems involved in sensing these substances inside the environment of the brine tank of a water softener. This invention also includes a device that is preferably on the outside of the brine tank without making any major modifications to the container, and with a means for sensing into the container preferably through the wall. This invention further includes an alert signaler located in a frequented area of the house so it will be noticed when it alarms.

According to one aspect of the present invention, a water softener salt tank monitoring system is provided in which the system includes a sensing unit capable of sensing the presence of the solution inside the container or brine tank through the use of means for sensing that includes capacitive elements. This capacitive sensing unit is connected to a monitoring device that processes the data from the sensing unit. The sensing unit and monitoring device are contained within a housing preferably adapted to be positioned on the exterior of the water softener salt tank. The system notifies a user of a low salt condition through an alarm that can be mounted on the brine tank or elsewhere in the home.

The system for monitoring can alternatively use another type of indirect means for sensing such as an inductance-based, infrared wave-based or electromagnetic wave-based system. The inductance-based system preferably utilizes an inductive coil to sense the presence of the solution inside the brine tank. The infrared wave-based system preferably emits an infrared wave or beam that is either reflected back by the solution or is sensed on the other side of the container by a receiver. The electromagnetic wave-based system emits low frequency radio waves that are reflected back to the sensing unit. The reflecting waves' intensity and return time are used to calculate a level of salt in the brine tank. Each of these sensing units is connected to a monitoring device that monitors the tank and actuates an alarm mechanism as needed.

According to another aspect of the present invention, the unit housing is attached to the outside of the brine tank through a variety of techniques. This includes the use of an adhesive, tabs having double sided tape, hook and loop fasteners (e.g., Velcro), tabs having a male and female connection and a rod fastened to the tank upon which the housing may be slid up and down.

According to still another aspect of the present invention, a capacitance-based monitoring system includes a computer comprised of a processor and memory, for example, on a chip. Software running on the processor tracks the variations in capacitance values and cycle times to aid in detecting the salt level. Other software permits various other aspects of the present invention. One such aspect includes the processor determining a proper threshold for setting an alarm point. Another aspect includes the processor operating without determining a threshold by analyzing high and low capacitance values. Still another aspect permits a user to vary the sensitivity setting of the detection mechanism. A further aspect measures capacitance high points, low points, and the time between them to enable the detection mechanism to go into a sleep mode, thereby increasing battery life. Yet another aspect tracks the time between high and low points to determine if the tank has a build-up of substance on the inside of the tank.

According to yet another aspect of the present invention, an induction-based detection mechanism is located in a housing that is mounted on a shaft fastened to the tank. The device housing slides up and down on the shaft until the inductance of the solution is sensed. The housing can then be fixed in place to monitor the substance in the tank.

According to another aspect of the present invention, an infrared-based monitoring system is used. An infrared wave or beam is generated that may be reflected back by the substance in the tank. If the level of the substance is below the infrared wave, the infrared wave is sensed by a sensing unit on the opposite side of the tank.

According to still another aspect of the invention, the monitoring device, detection mechanism and sensing unit are preferably housed in an airtight and watertight enclosure made of plastic material that is as close as possible in proximity to a container surface of regular or irregular shape. The enclosure is easily installed by a person of normal abilities in a cost effective and efficient way. The enclosure has the ability to conform to the irregular shapes through inventive flexible mounting pads. The pads can be permanently attached to the enclosure or permanently attached to the surface with the ability to remove and replace the enclosure on the surface for maintenance issues.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
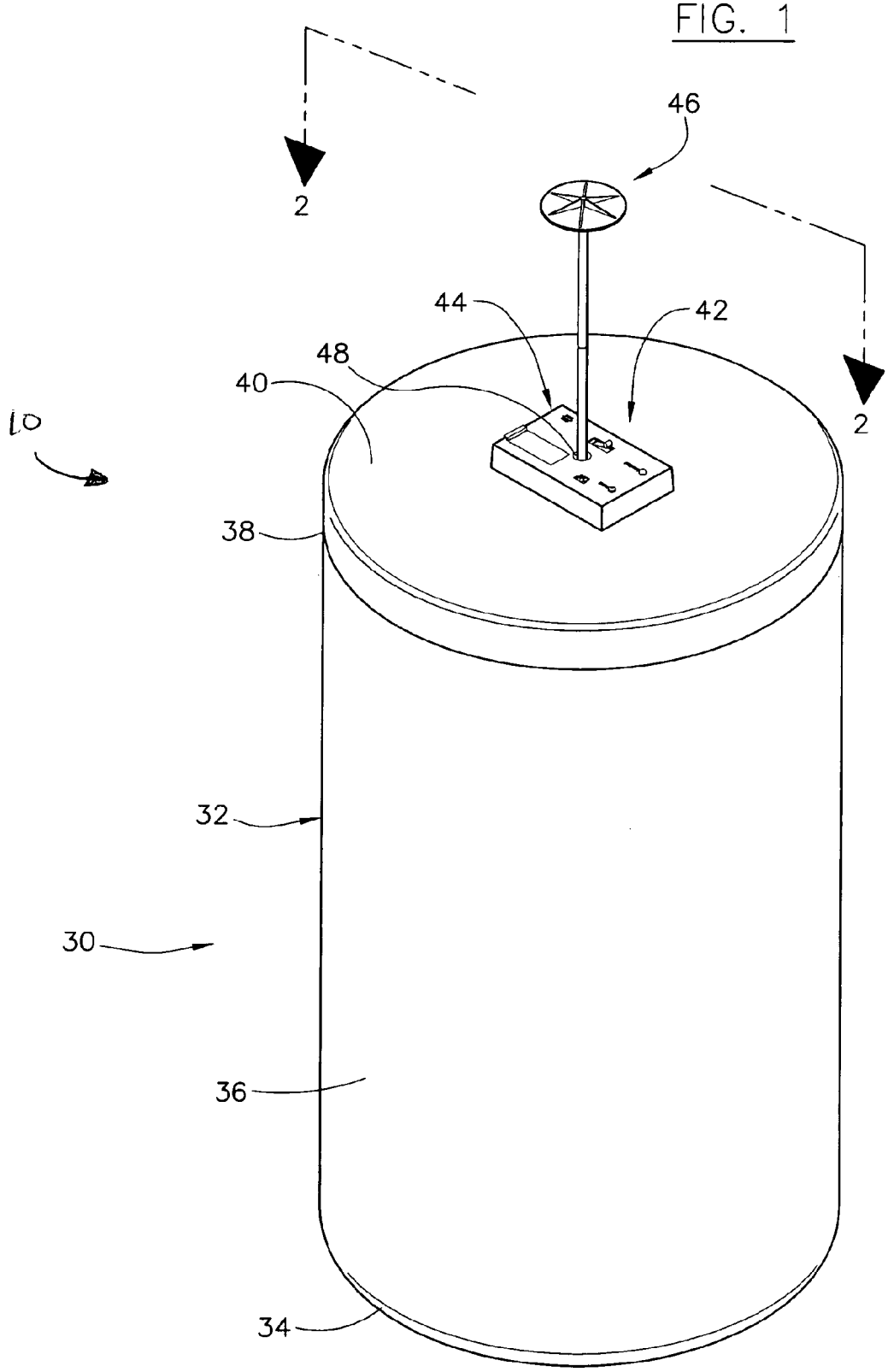
FIG. 1 is an isometric view of a system of the present invention having a water softener tank including a first embodiment of a monitoring device.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected," "attached" or terms similar thereto are often used. They are not limited to direct connection or attachment but include connection or attachment through other elements where such is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

With reference now to the drawing figures, FIGS. 1-29 in which like reference numerals designate like parts throughout the disclosure, the present invention is a system 10 including a container, for example, a typical water softener salt tank 30.

In FIG. 1, the tank 30 is generally rectangular in shape and includes a preferably plastic body 32 having a closed lower end 34, a generally cylindrical sidewall 36 extending upwardly from the lower end 34 and an open upper end 38 opposite the lower end 34. The tank 30 also includes a cover 40 releasably engageable with the upper end 38 in order to enclose the body 32. Such a tank is readily available through several commercial vendors.

Referring now to FIGS. 1-4, tank 30 preferably also includes an inventive salt monitoring device 42 mounted to the cover 40. The device 42 includes a sensor 44 positioned on the cover 40 opposite the body 32 and a detection mechanism 46 connected to and extending through the sensor 44. The mechanism 46 is positioned partially within and partially outside of the tank 30 by extending the mechanism 46 through an opening 48 in the sensor 44 that is aligned with a similar opening 50 in the cover 40.

Looking now at FIGS. 2-8, the detection mechanism is preferably a direct detection mechanism 46 including a lower member 52 positioned within the tank 30, an upper member 54 positioned outside of the tank 30, and a central member 56 extending between the lower member 52 and upper member 54. Each of the components of the detection mechanism 46 is formed from a generally rigid, inert material, such as a hard plastic, and preferably ABS plastic, that is not detrimentally affected by prolonged exposure to salinic conditions and is relatively easy to form into the components of the mechanism 46. Further, while the lower member 52 and upper member 54 are generally circular in shape and extend radially outwardly from the point of connection of each of the lower member 52 and upper member 54 to the central member 56, the lower and upper members can have any desired shape. The lower disk member 52 rests on an upper surface 200 of an amount of salt 202 positioned within the body 32 of the tank 30. Further, the central member 56 is formed to have a diameter slightly less than the diameter of the opening 48 in the sensor 44 and opening 50 in the cover 40, such that the central member 56 can slide with respect to the sensor 44 and cover 40.

Figure 2:
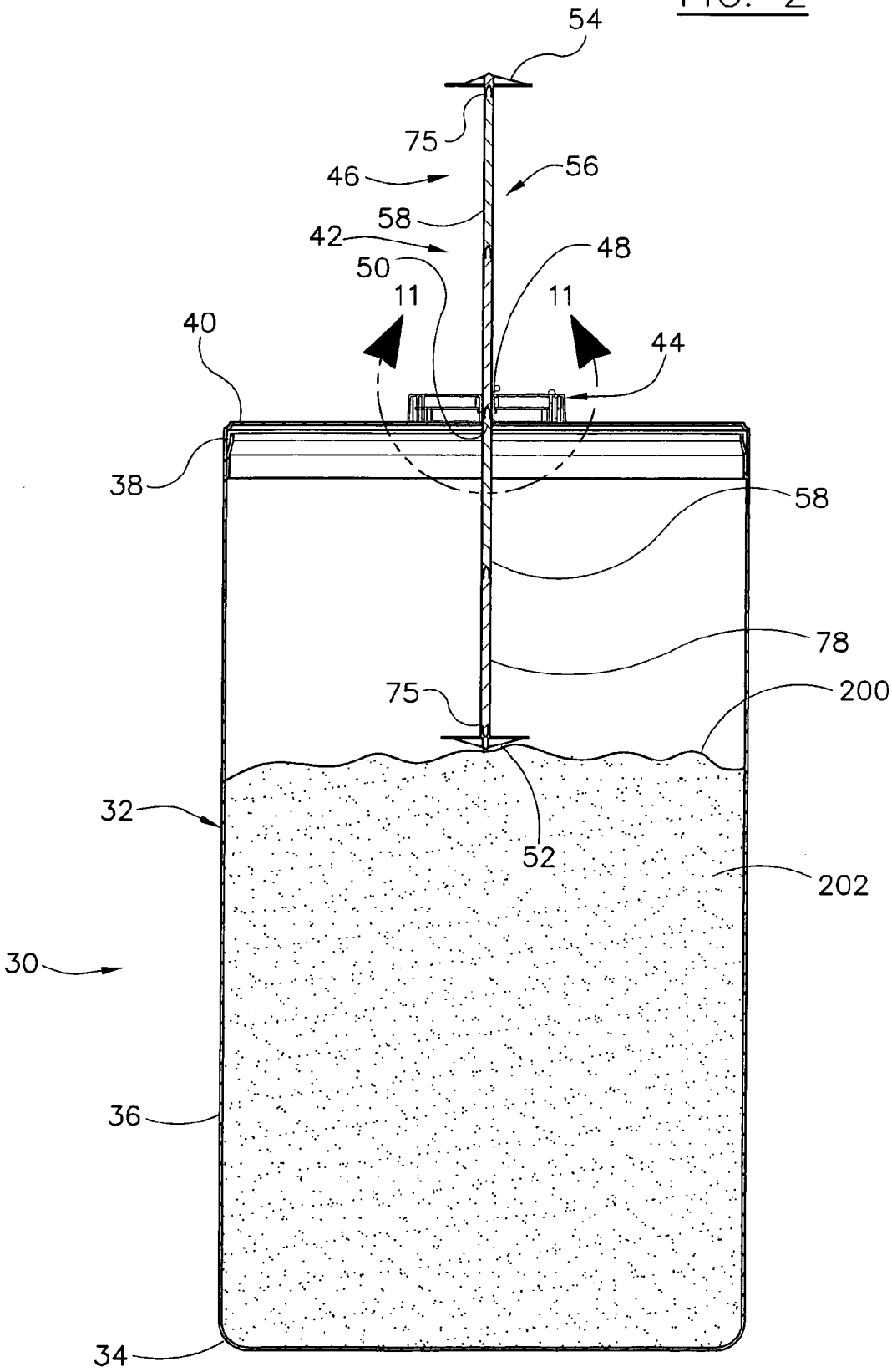
FIG. 2 is a cross-sectional view along line 2-2 of FIG. 1.
Figure 3:
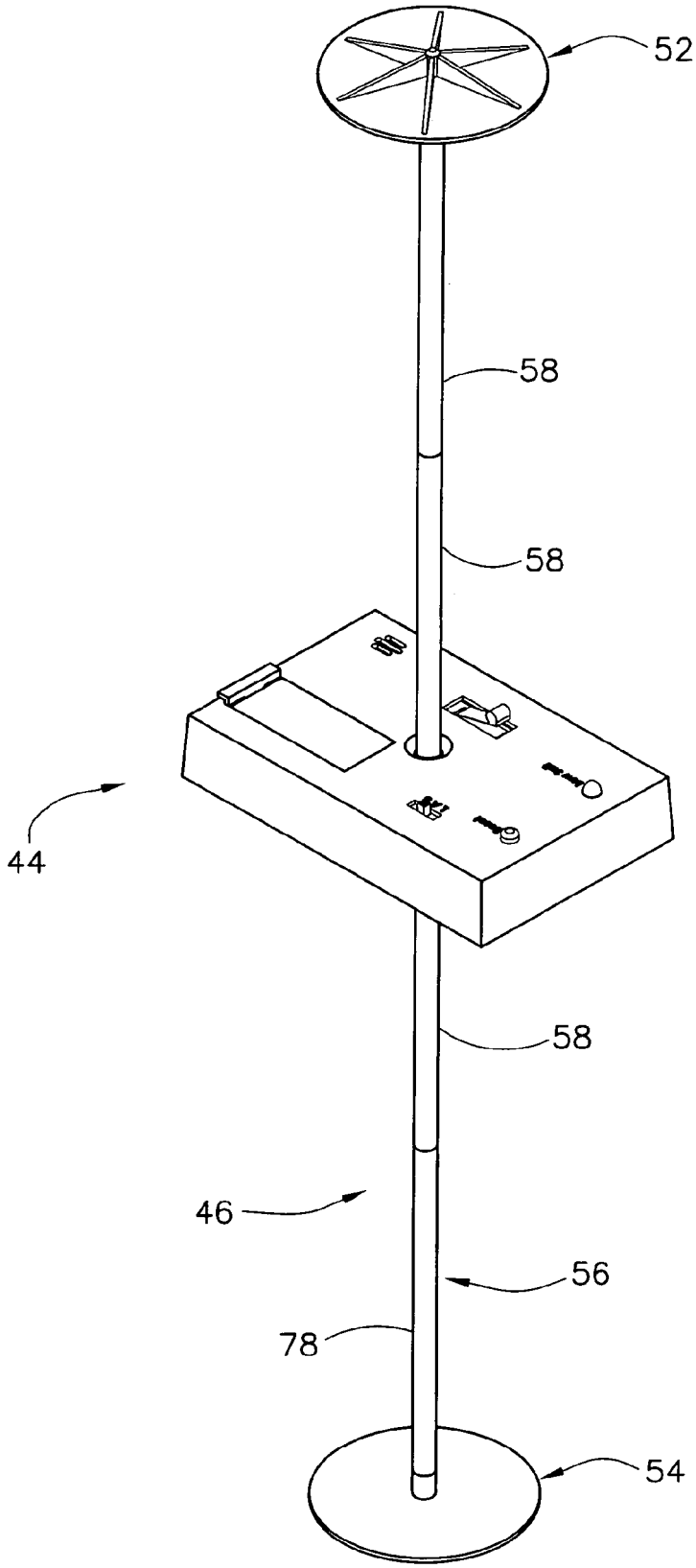
FIG. 3 is an isometric view of the monitoring device of FIG. 1.
Figure 4:
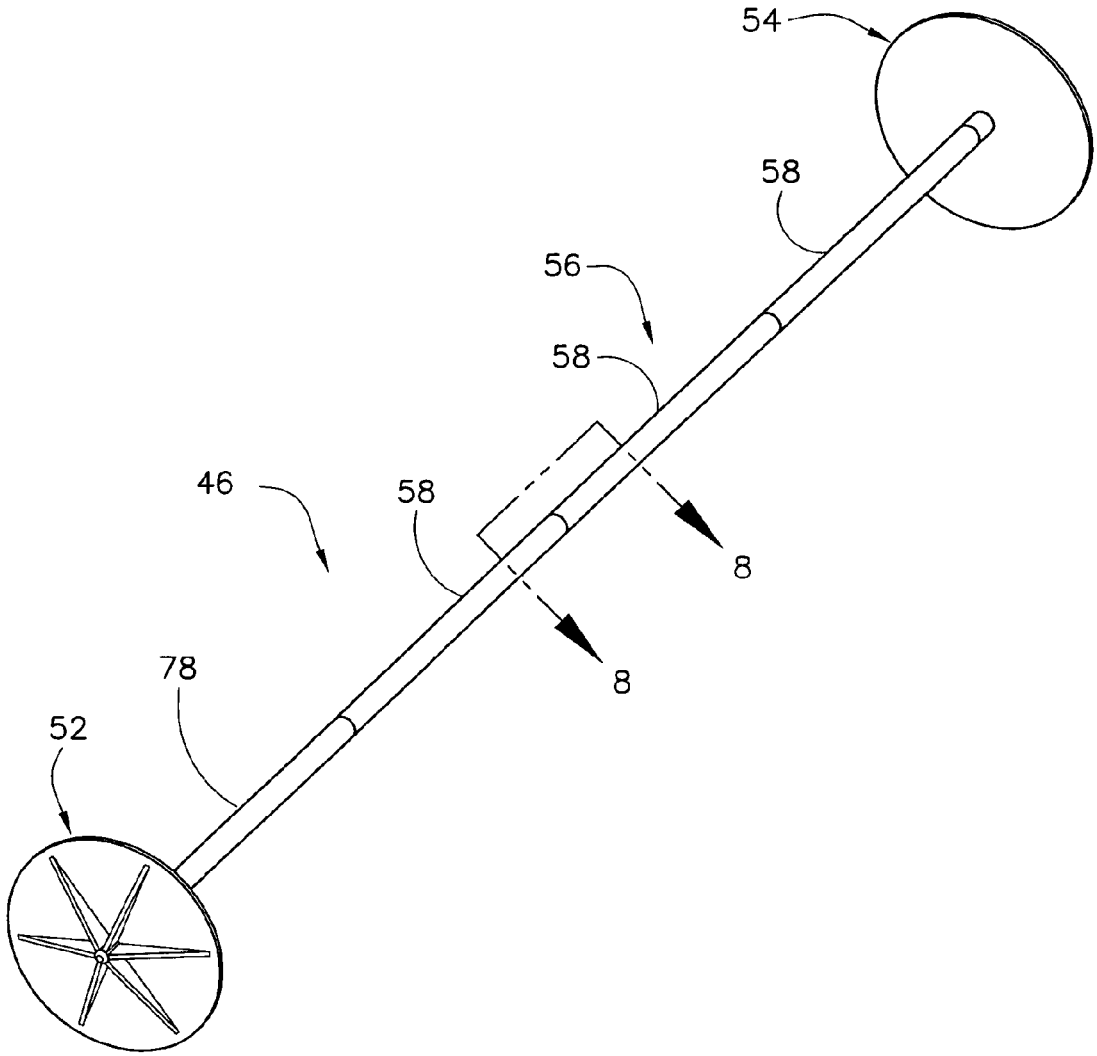
FIG. 4 is an isometric view of a direct detection mechanism of the device of FIG. 3.
Figure 5:
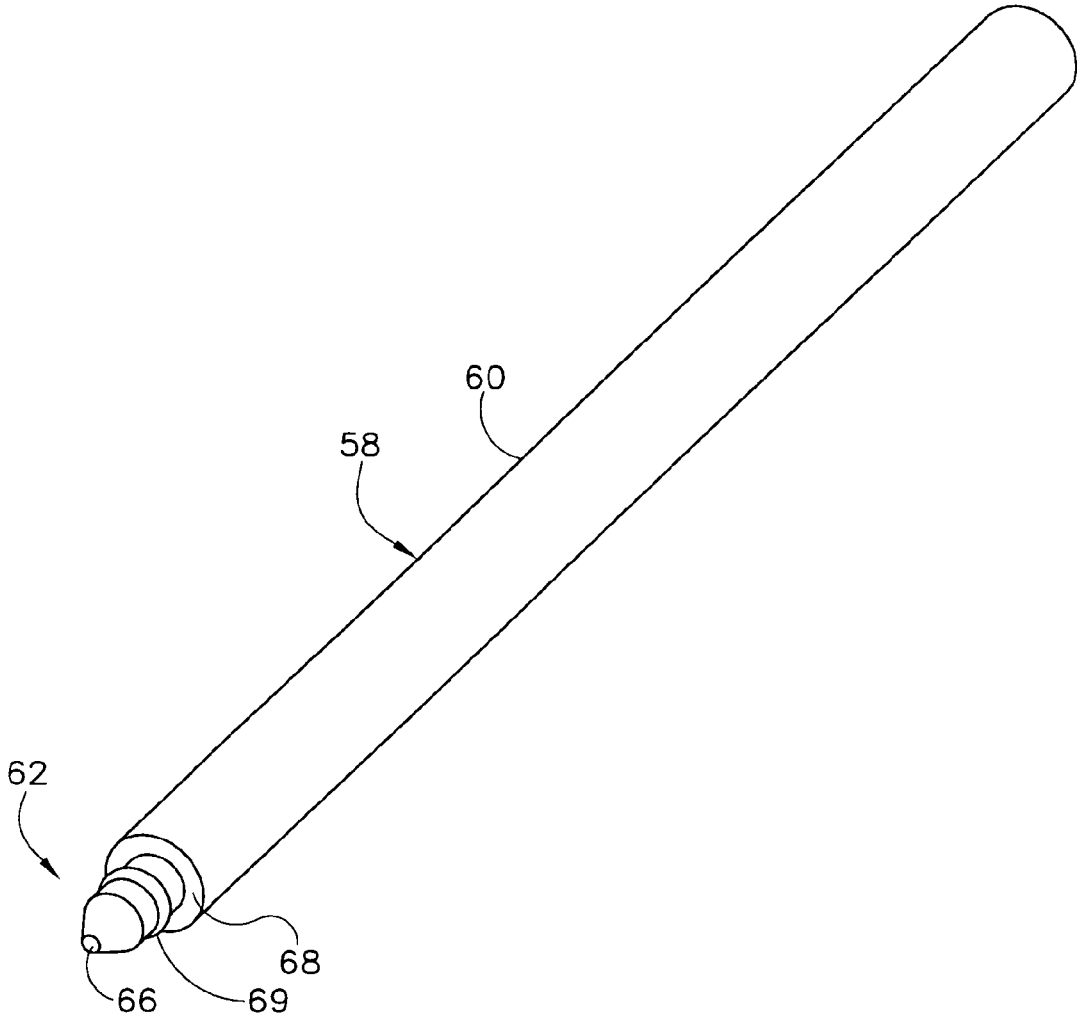
FIG. 5 is an isometric view of a first embodiment of a modular component of the direct detection mechanism of FIG. 4.
Figure 8:
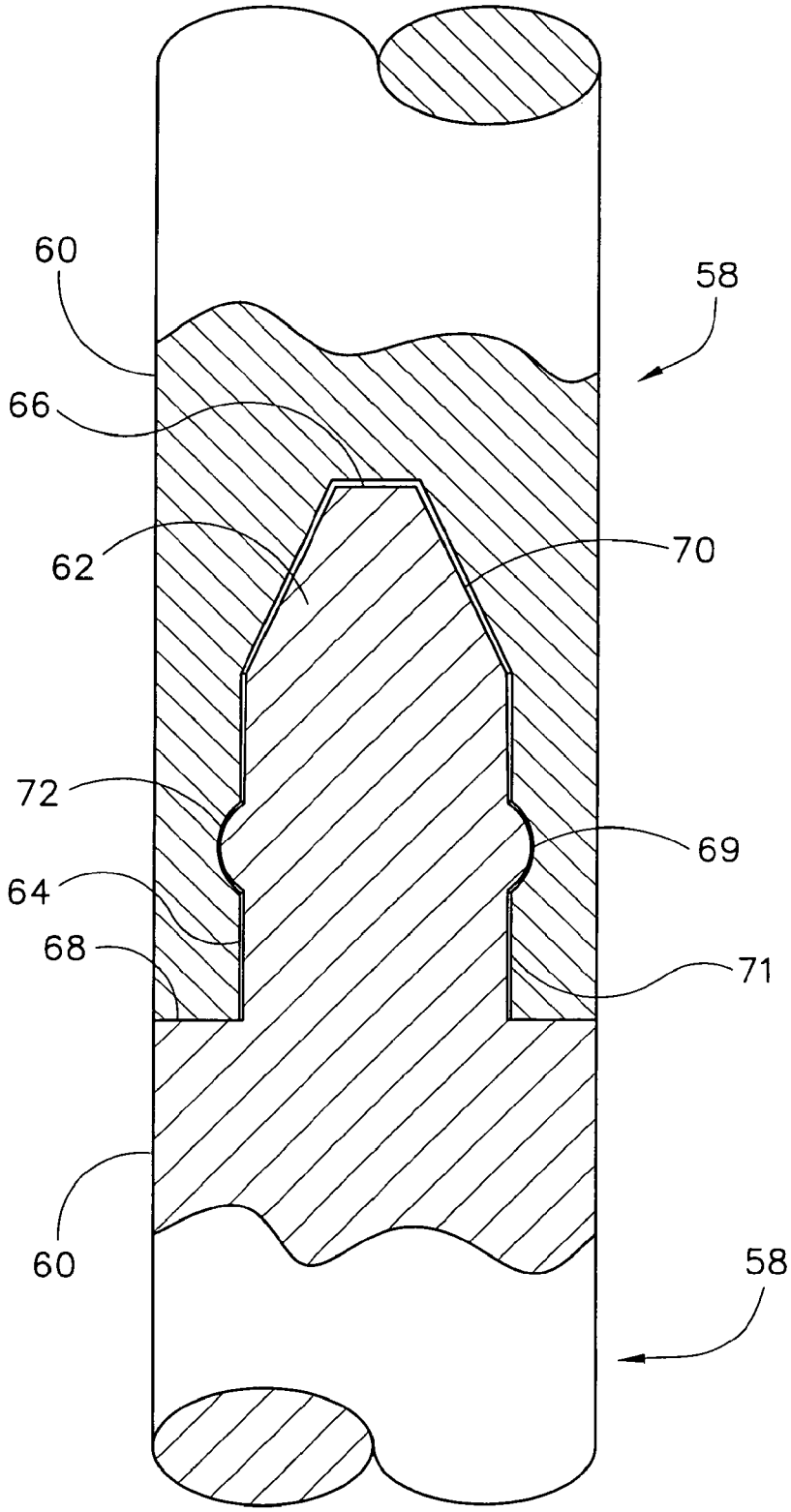
FIG. 8 is a cross-sectional view along line 8-8 of FIG. 4.
Figure 9:
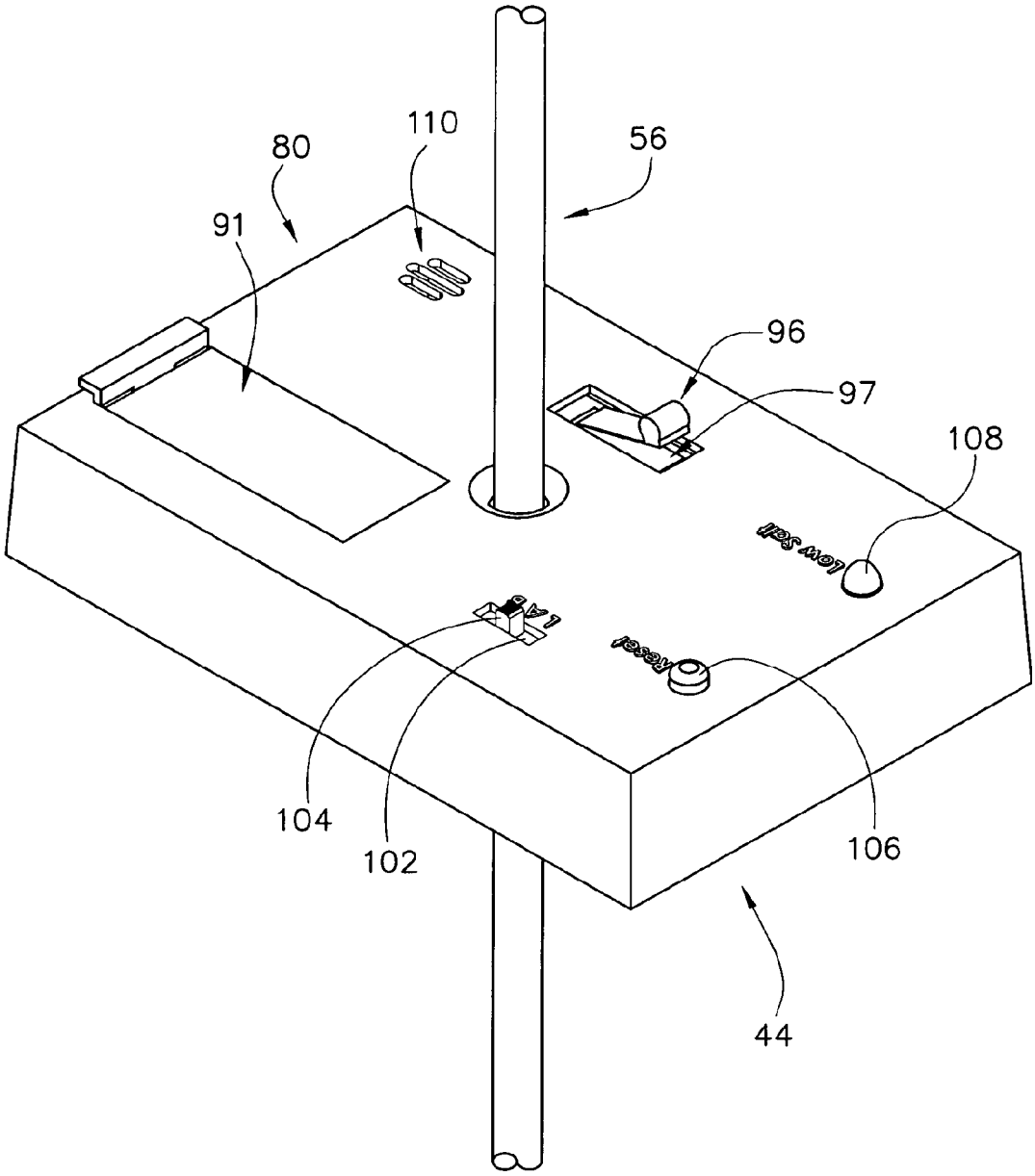
FIG. 9 is a partially broken away, isometric view of the sensor and direct detection mechanism of the monitoring device of FIG. 3.
Figure 10:
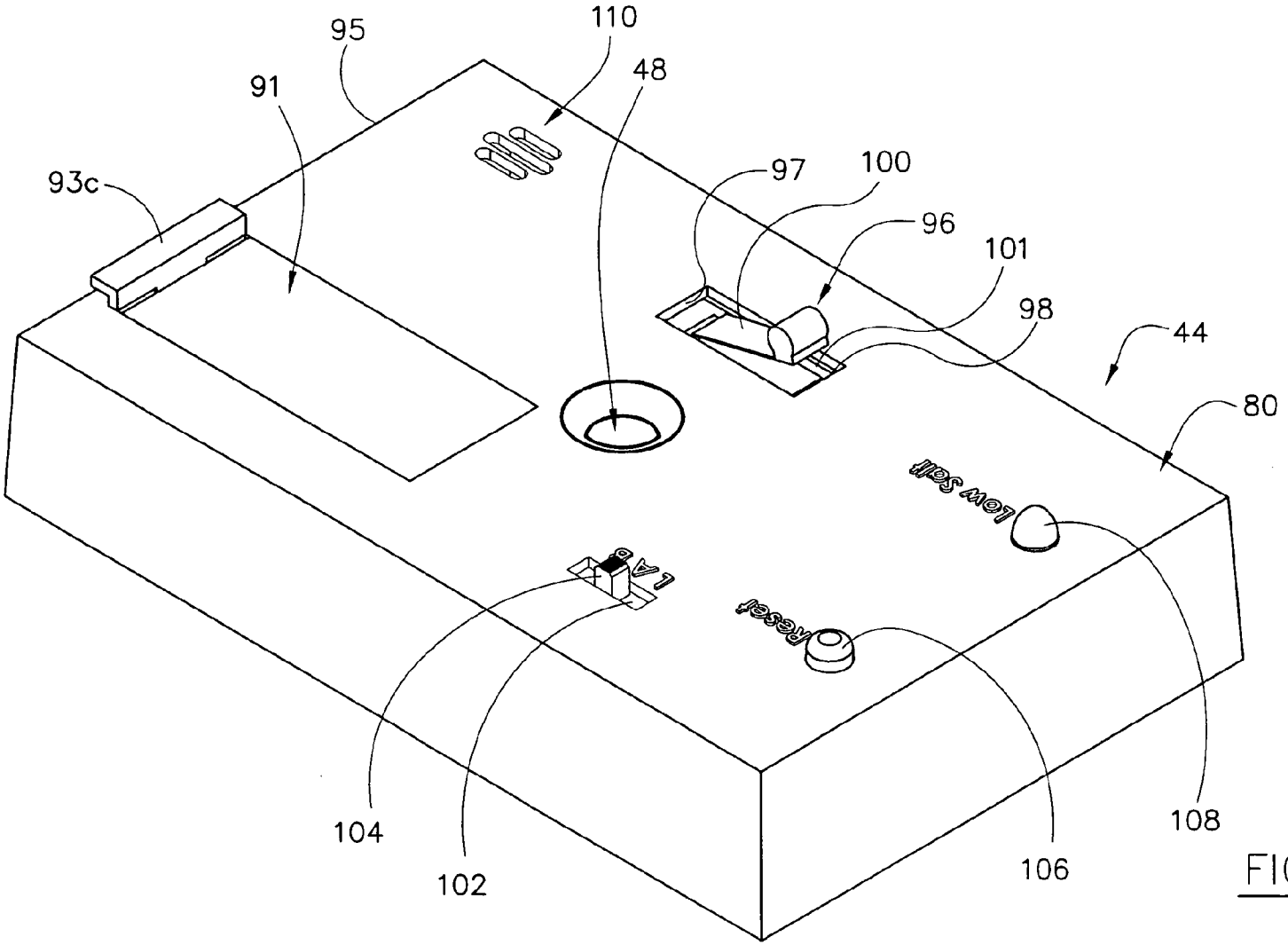
FIG. 10 is an isometric view of the sensor of the monitoring device of FIG. 9.
Figure 11:
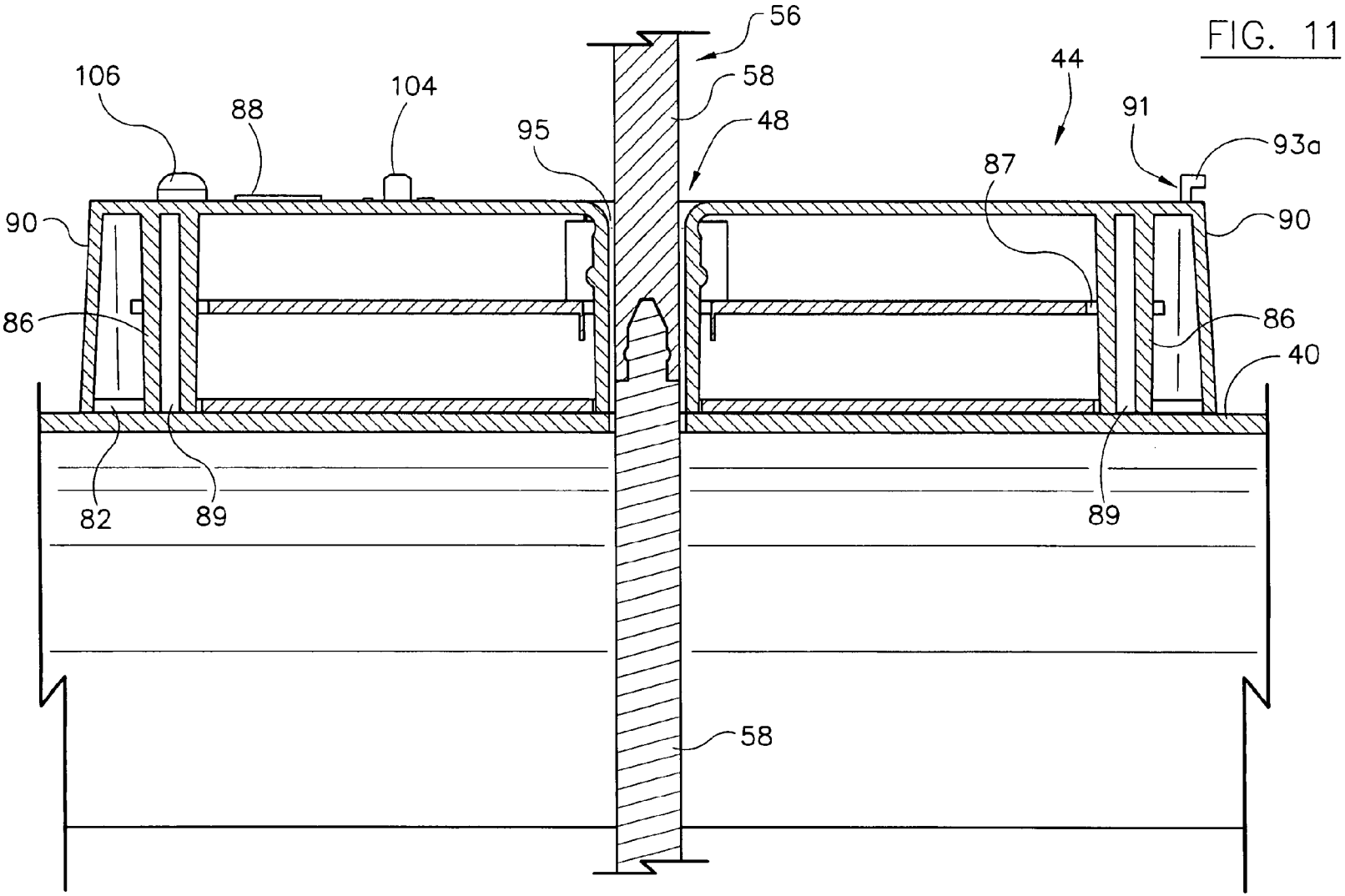
FIG. 11 is a circular cross-sectional view along line 11-11 of FIG. 2.

The central member 56 is adaptable for use with containers 30 having various sizes due to the construction of the central member 56 from a number of modular segments 58. As best shown in FIGS. 2, 5 and 8, each segment 58 preferably includes a generally cylindrical body portion 60 that supports protruding attachment 62 at one end and a recess 64 at the opposite end. The attachment 62 preferably has an outer end 66 spaced from the body portion 60 that is generally frusto-conical in shape, and a cylindrical base 68 extending from the body portion 60 to the outer end 66. The base 68 also includes a peripheral flange 69 spaced between the outer end 66 and the body portion 60.

The recess 64 is shaped to be matingly engageable with the attachment 62, such that the recess 64 includes an inner tapered end 70, a cylindrical bore 71 and a peripheral notch 72 spaced from the tapered end 70. Consequently, when an attachment 62 on one body portion 60 is inserted into a recess 64 on an adjacent body portion 60, the respective body portions 60 are engaged with one another as best shown in FIG. 8. Any number of modular segments 58 can be joined or releasably secured in this manner to construct a central member or rod 56 having the appropriate length for a given tank 30, allowing the detection mechanism 46 to be adapted for use with any size water softening tank 30. Further, in order to engage the lower disk member 52 and upper disk member 54 with the respective modular segments 58 on opposite ends of the central member 56, each of the lower member 52 and upper member 54 includes a hub 74 including a central sleeve 75 (FIG. 2) shaped identically to the recesses 64 and supported on the members by a number of spaced, triangular ribs 76, best shown in FIG. 7. Thus, each of the lower member 52 and upper 54 are adapted to receive and engage an attachment 62 on a modular segment 58 in the manner shown in FIG. 8.

Figure 6:
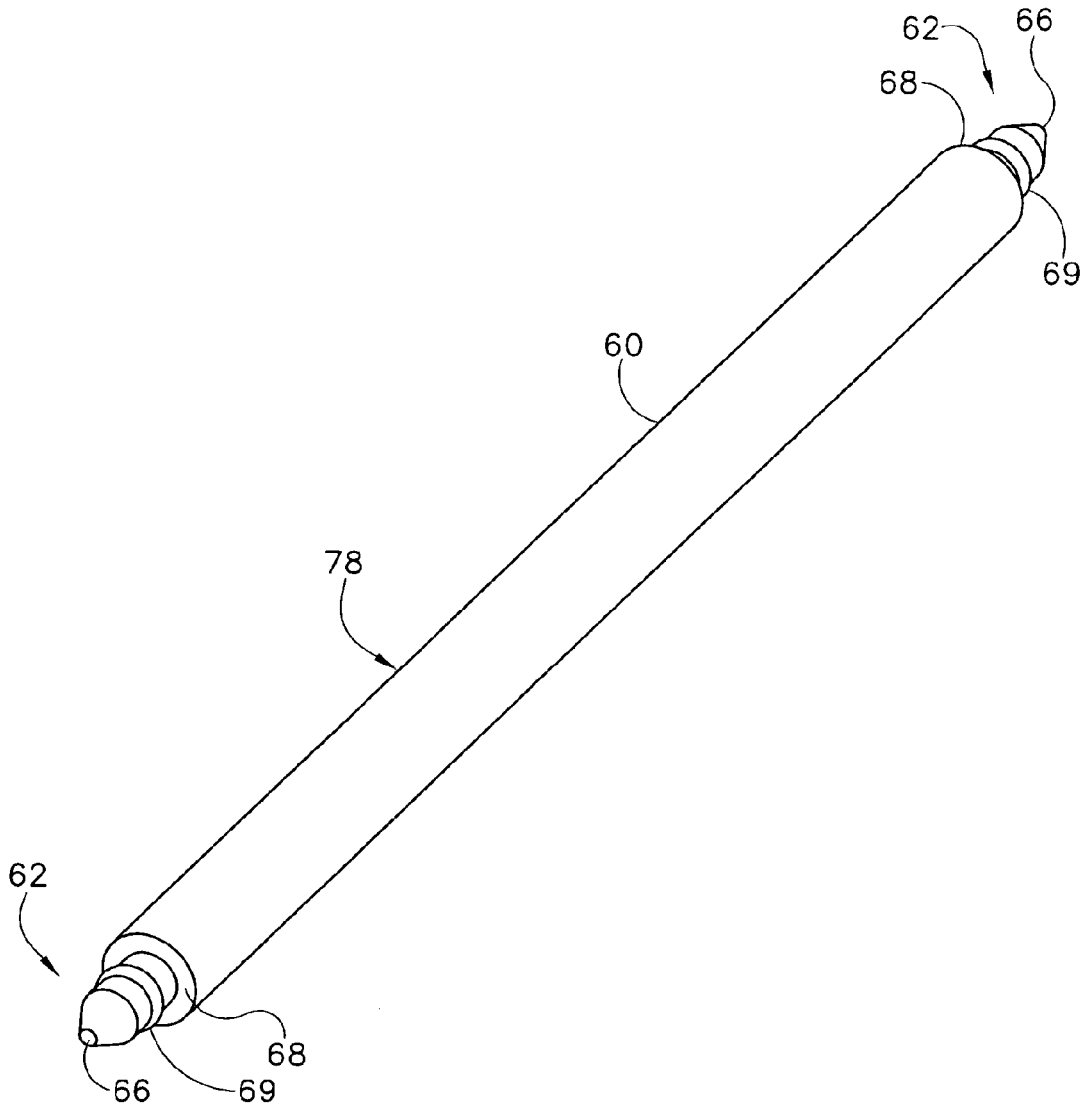
FIG. 6 is an isometric view of a second embodiment of a modular component of the direct detection mechanism of FIG. 4.
Figure 7:
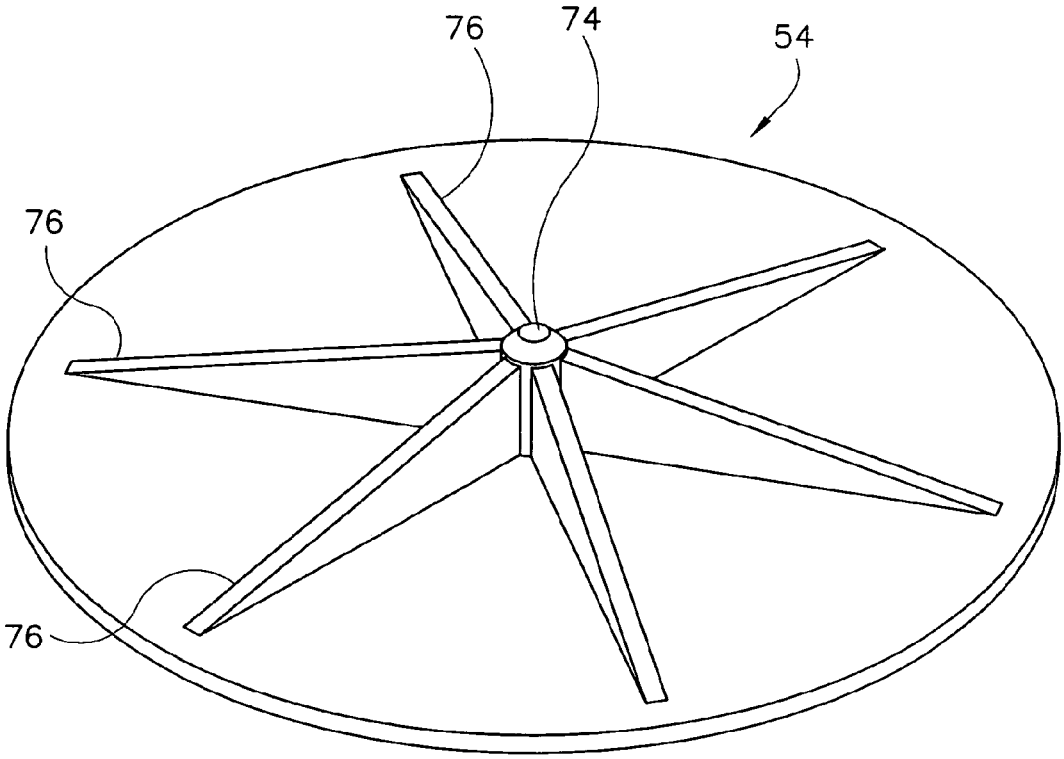
FIG. 7 is an isometric view of an end plate of the direct detection mechanism of FIG. 4.

As one end of each segment 58 has a recess 64, in order to enable one of the lower member 52 or the upper member 54 to be secured to the central member 56, an end segment 78, best shown in FIG. 6, is also used to form the central member 56. The end segment 78 is formed similar to the segments 58 with the exception of a second attachment 62 positioned on one end of the end segment 78 where the recess 64 is located on a segment 58, such that the end segment 78 can engage both the sleeve 75 in one of the lower member 52 or upper member 54 and the recess 64 in the adjacent modular segment 58.

Figure 12:
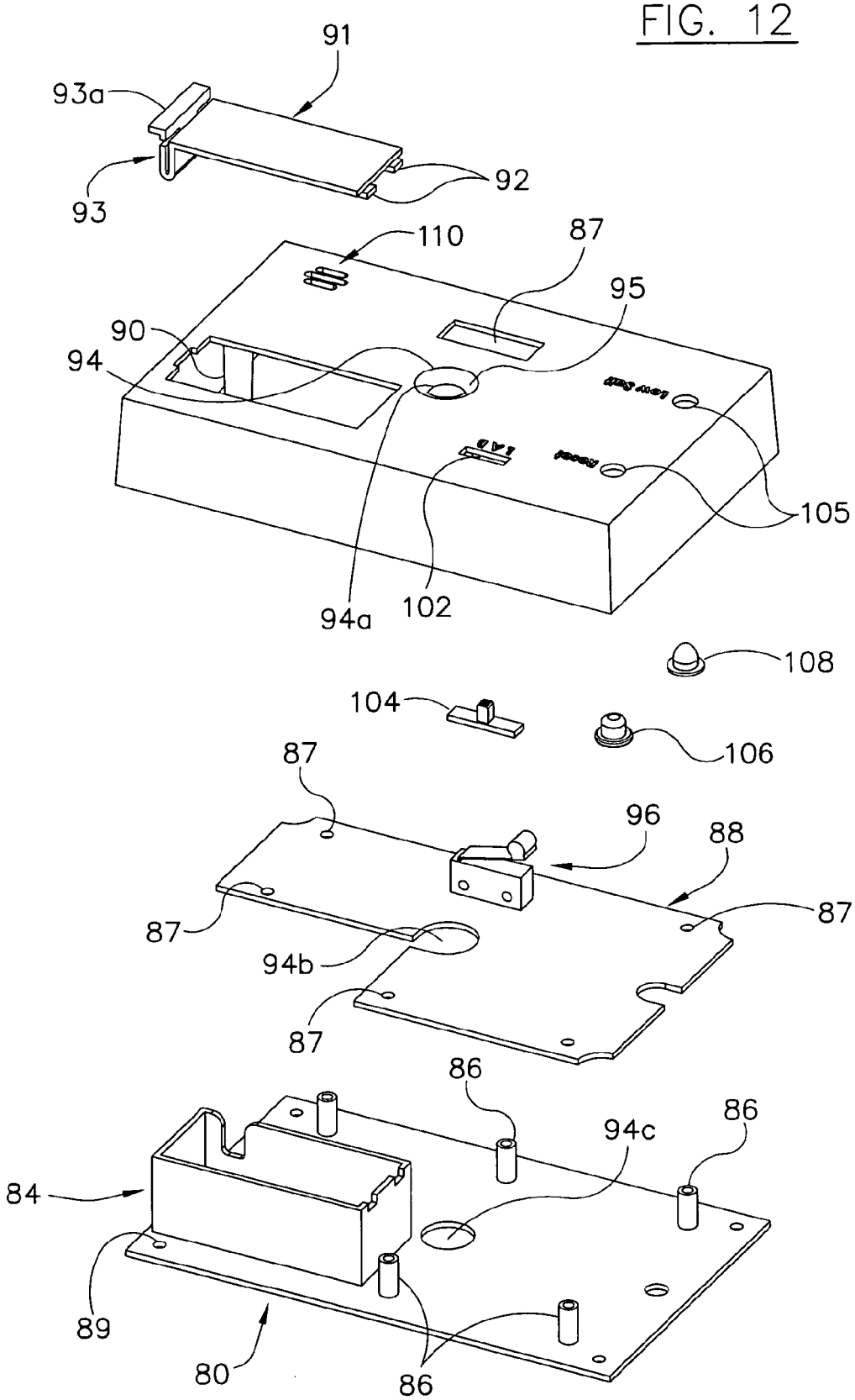
FIG. 12 is an exploded isometric view of the sensor of FIG. 10.
Figure 13:
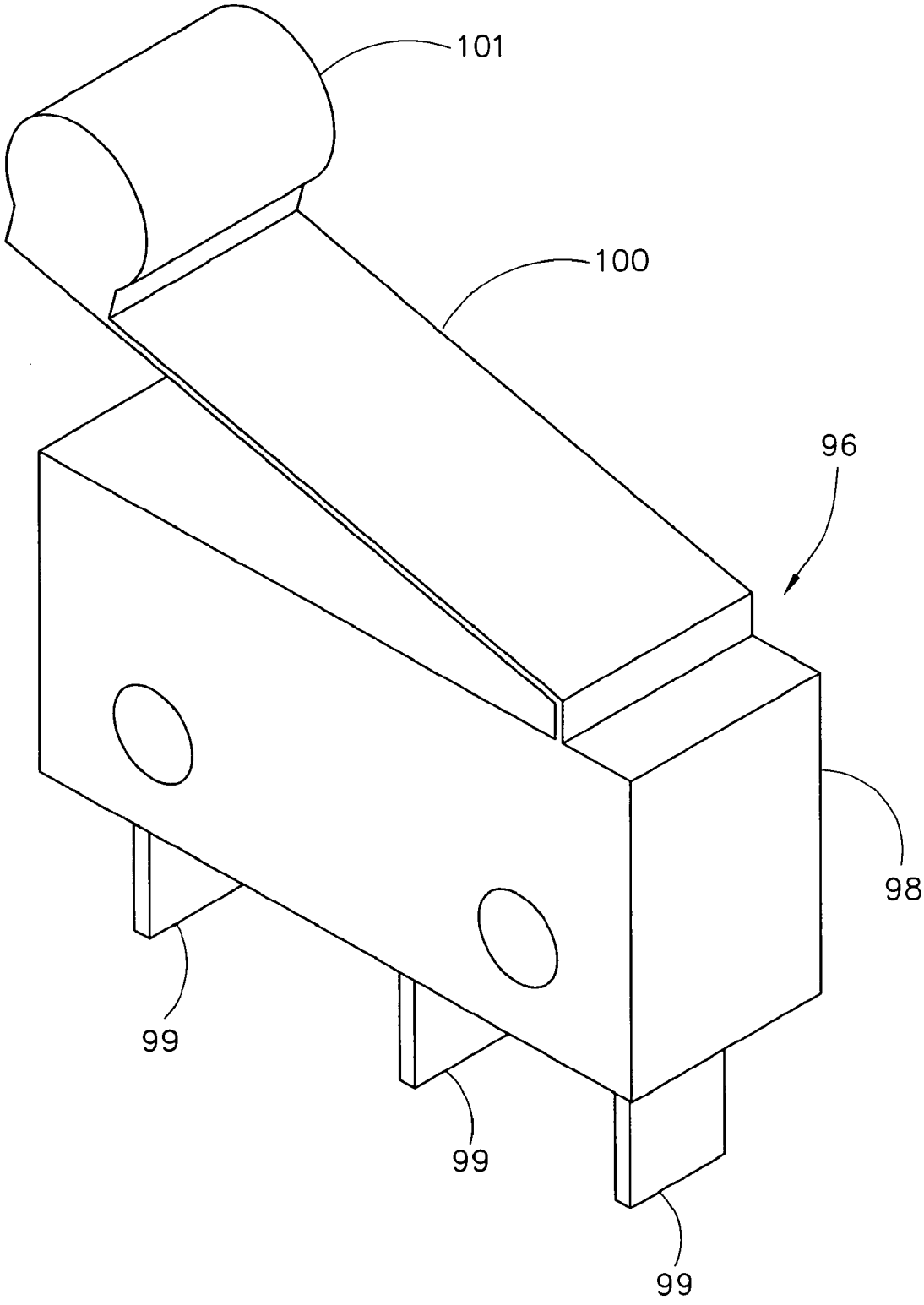
FIG. 13 is an isometric view of a limit switch of the sensor of FIG. 12.

Referring now to FIGS. 9-13, the sensor 44 through which the detection mechanism 46 extends is illustrated as including a generally rectangular housing 80 that is fixed to the cover 40. As best shown in FIG. 12, the housing 80 is secured to a base 82 having a power source receptacle 84, for receiving a battery (not shown) and a number of mounting stems 86 thereon. Alternatively, the base 82 can include a plug and cord (not shown) engageable with a conventional electrical outlet (not shown). A circuit plate 88 capable of supporting or having circuitry (not shown) printed thereon is positioned around the receptacle 84 and mounted to the stems 86 opposite the base 82 using suitable fasteners (not shown) inserted through openings 87 in the plate 88. The plate 88 helps to form the necessary electrical connections between the various components of the sensor 44. The housing 80 is fixed to the base 82 over the circuit plate 88 using fasteners (not shown) inserted through openings 89 in the base 82 and engaged with mounting channels 90 on the housing 80 aligned with the openings 89.

The housing 80 also includes a removable panel 91 having a pair of tabs 92 at one end and a biased lock 93 with a handle 93a at the opposite end. Tabs 92 are engageable with opposed ends of an opening 94 in the housing 80 to selectably expose the power source receptacle 84 in order to enable a replaceable power source, such as a battery (not shown), to be connected to the sensor 44 in any conventional manner and positioned and retained within the receptacle 84. The housing 80, base 82, and circuit plate 88 also each include a central aperture 94a, 94b and 94c, respectively, that are aligned with one another to form the opening 48 through which the central member 56 of the detection mechanism 46 extends. The aperture 94a in the housing 80 can also include a flexible skirt 95 extending into the aperture 94a around the central member 56 to prevent material from passing through the opening 48 and around the central member 56 into the tank 30. The skirt 95 may also act as a humidity seal.

In the embodiment shown, the power source within the receptacle 84 is connected via the circuit plate 88 to a limit switch 96 fixed to the circuit plate 88 and extending outwardly through a first slot 97 in the housing 80. The switch 96 includes a base 98 secured by prongs 99 to the circuit plate 88 and a biased arm 100 extending outwardly from the base 98 through the slot 97 and supporting a stop 101 opposite the base 98. The housing 80 also includes a second slot 102 that is spaced from the first slot 97 in which is disposed an operating switch 104 connected to the plate 88 and used to selectively change the operating mode of the sensor 44, i.e., to select light only (L), alarm only (A), or both (B), shown collectively as L, A, B positions. The housing 80 also preferably includes additional openings 105 for a reset button 106, an indicator lamp 108, and an audible alarm device 110 (e.g., a speaker) which are all connected to the plate 88 and allow the sensor 44 to provide visible and/or audible signals when a signal from the limit switch 96 is received by the sensor 44. Note: power is always on as long as a battery is installed, like a smoke alarm. However, the alarm may also sound when battery power is low.

More specifically, in operation, once an amount of salt 202 has been placed within the body 32 of the tank 30, the cover 40 and monitoring device 42 are positioned over the body 32. The lower member 52 of the detection mechanism 46 is positioned on the upper level 200 of the salt 202. As the water softening system operates, the upper level 200 of the salt 202 within the tank 30 is lowered, thereby allowing the lower member 52 and detection mechanism 46 to slide downwardly with respect to the sensor 44. When the upper salt level 200 has reached a predetermined lower limit based on the length of the central member 56, the detection mechanism 46 is positioned with respect to the tank 30 such that the upper member 54 contacts and depresses the stop 101 and the arm 100 of the limit switch 96. The depressing of the arm 100 sends a signal from the switch 97 to the plate 88 that serves to operate the sensor 44 to emit a visual signal using the indicator lamp 108 and/or an audible signal using the speaker 110 to alert an individual to the low level of salt present within the tank 30. As will be more fully described below, the alarm indicator may be located at a position closer to the individual's living area but remote from the location of the sensor and the softener, for example, in the basement.

Figure 14:
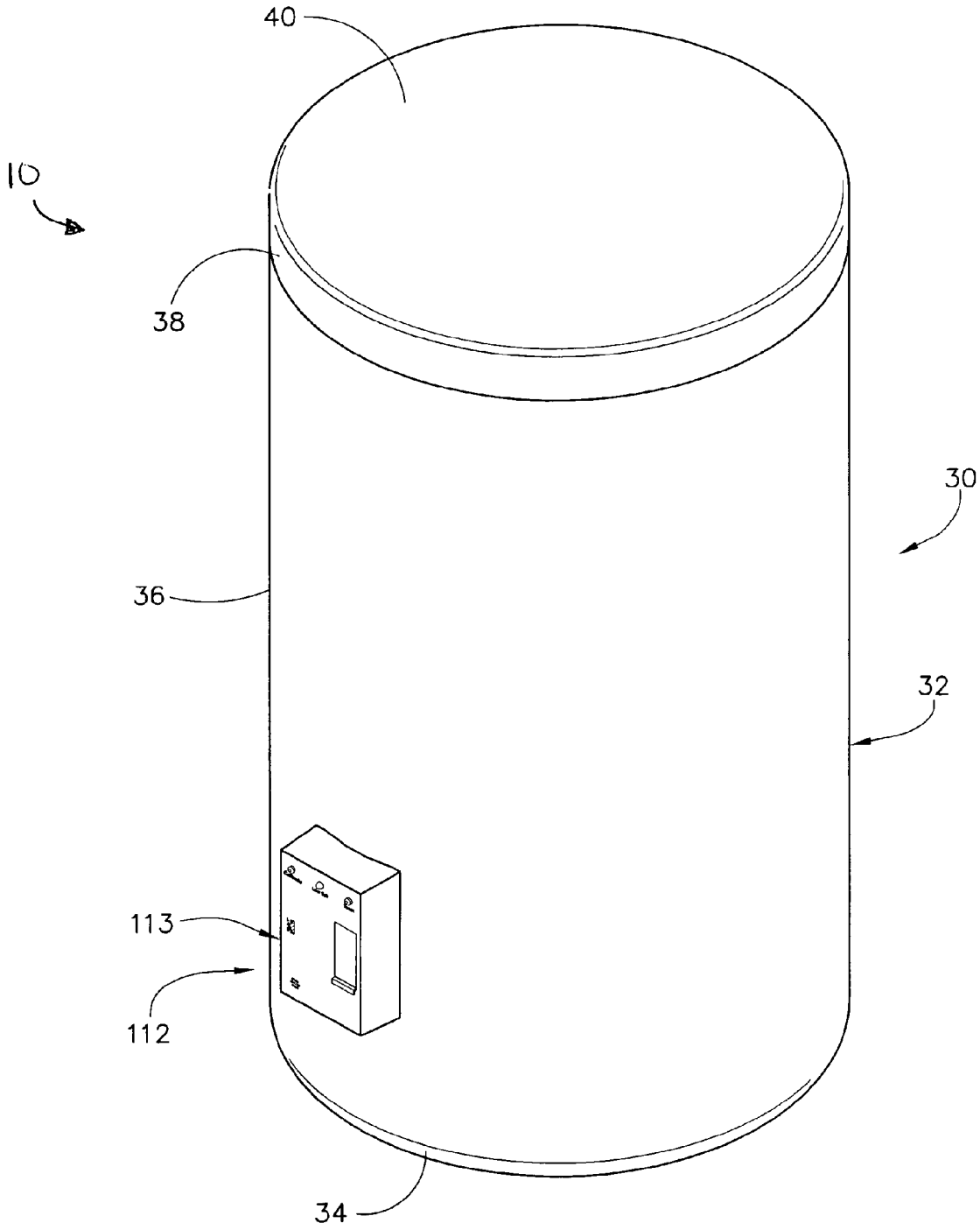
FIG. 14 is an isometric view of the system of the present invention having a water softener tank and a second embodiment of the monitoring device.
Figure 15:
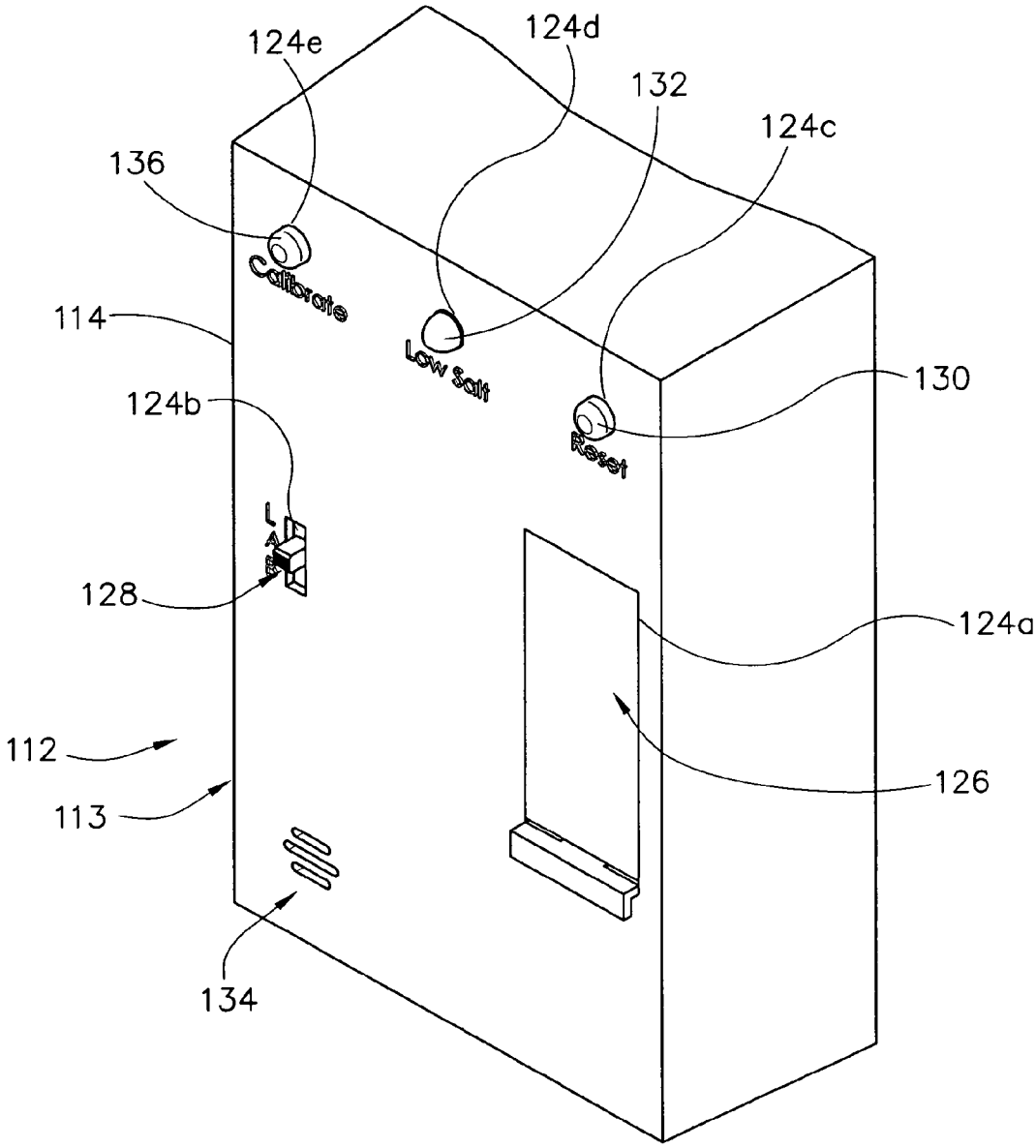
FIG. 15 is an isometric view of the sensor of the monitoring device of FIG. 14.
Figure 16:
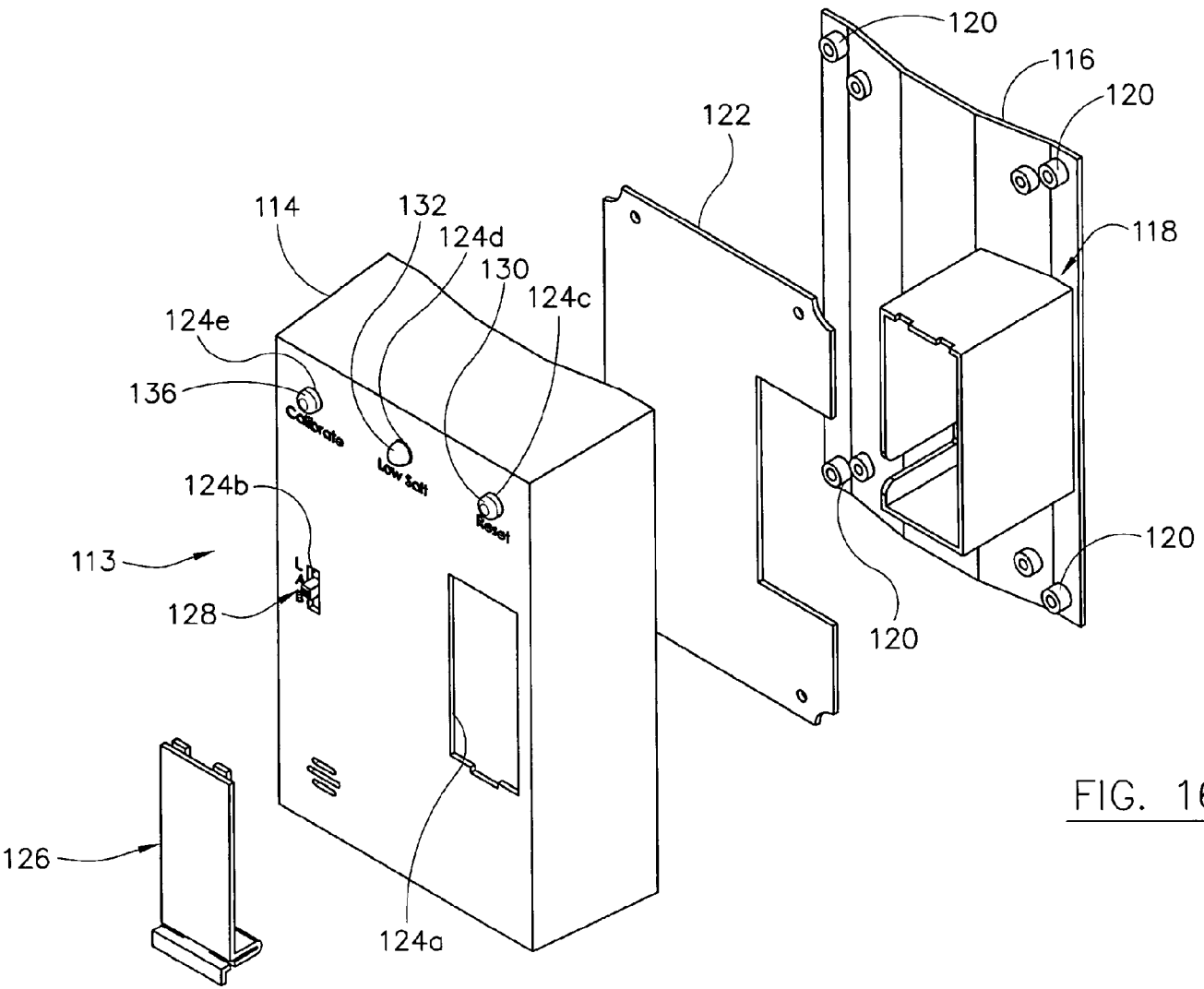
FIG. 16 is an exploded, isometric view of the monitoring device of FIG. 15.

Referring now to FIGS. 14-16, in a second embodiment of the present invention, the system 10 includes a monitoring device 112 that includes a sensor 113 mounted to the sidewall 36 of the body 32 of the tank 30 adjacent the lower end 34. The sensor 113 is formed similarly to the sensor 44 and includes a housing 114 secured to a base 116 including a power source receptacle 118 and a number of mounting stems 120 over a circuit plate 122 secured to the mounting stems 120 around the receptacle 118. The housing 114 is affixed to the base 116 in a conventional manner similar to that discussed previously and includes openings 124a-124d in which are located a removable panel 126, an operating switch 128, a reset button 130, and an indicator lamp 132, as well as a speaker 134, similarly to the housing 80.

However, the monitoring device 112 does not include a direct detection mechanism 46 as in the previous embodiment, but performs the monitoring function utilizing an indirect detection mechanism (not shown). The detection mechanism utilized by the device 112 is a mechanism that is constructed and functions similarly to that shown in Heger U.S. Pat. No. 6,023,159, which is herein incorporated by reference. Specifically, in this mechanism, the sensor 113 includes a means for sensing, e.g., a capacitor plate (not shown) and a ground plate (not shown) disposed on or adjacent the base 116 near the sidewall 36 of the tank 30. The plate senses the capacitance of the material within the tank 30 immediately adjacent the device 112 and compares this capacitance value to a reference value stored within the device 112. The reference value is a value corresponding to a condition where the upper level 200 of salt 202 within the tank or container 30 has reached a lower limit approximately just beneath the level of the device 112. The reference value is determined and stored in any suitable manner (e.g., on a computer chip) within the device 112 by positioning the device 112 against the tank 30 either prior to the addition of salt to the tank 30 or above the upper level 200 of the salt 202 within the tank 30 and sensing the capacitance of the tank 30 without any salt 202 adjacent the device 112 by depressing a calibrate button 136 disposed on the housing 114 in an opening 124e. The device 112 can also effectively monitor the upper level 200 of the salt 202 within the tank 30 at preselected intervals utilizing a timer (not shown) located within the device 112 and connected to the indirect detection mechanism to selectively operate the detection mechanism at the end of each interval measured by the timer.

When the device 112 determines the salt level in the tank 30, the capacitance of the material within the tank 30 is measured by the detection mechanism, and this actual capacitance value is compared with the calibration or reference value stored in the device 112. If the actual capacitance value is a predetermined percentage above the reference value, the device 112 can retest for the actual capacitance value to provide an assurance factor in the accuracy of actual value obtained by the device 112, and/or can initiate the timer to countdown another interval prior to a subsequent test. However, if the actual capacitance value determined is equal to or above the reference value, the device or indicator 112 can initiate an audible and/or visual alarm or alert utilizing the speaker 134 and lamp 132 on the housing 114.

For example, two formulas are instructive for illustrating at least this embodiment and method. The first formula is for calibrating the device 112 at the point it is attached with the substance at the point of attachment. In terms of determining the level of substance in a container, i.e., salt in the tank 30, one method preferably uses, e.g., software or a chip within the device 112 to look at the difference between a reference value and an actual value. The reference value is determined by the previously described calibration, at the point where the device is attached, with the tank filled, or at least with salt above the level at where the device is attached. That value is stored in the device. If the actual value is a predetermined percentage, (e.g. 10%) greater than the reference value, the device will notify the user of the low salt condition. Thus, the formula for this operation can be represented as follows:

$$\text{Notify If: Actual Value} > (\text{Reference Value} + (\text{Reference Value} \times 10\%))$$

The second formula can be for calibrating the device 112 over an empty spot on the tank 30 or when the salt is below the level that the device is attached. The device can also be configured to be calibrated over an empty tank. In this method, if the actual value is less than a predetermined percentage, (e.g. 10%) greater than the reference value, the device will notify the user of the low salt condition. Thus, the formula for this operation can be represented as follows:

Notify If: Actual Value<(Reference Value+(Reference Value×10%))

Figure 17:
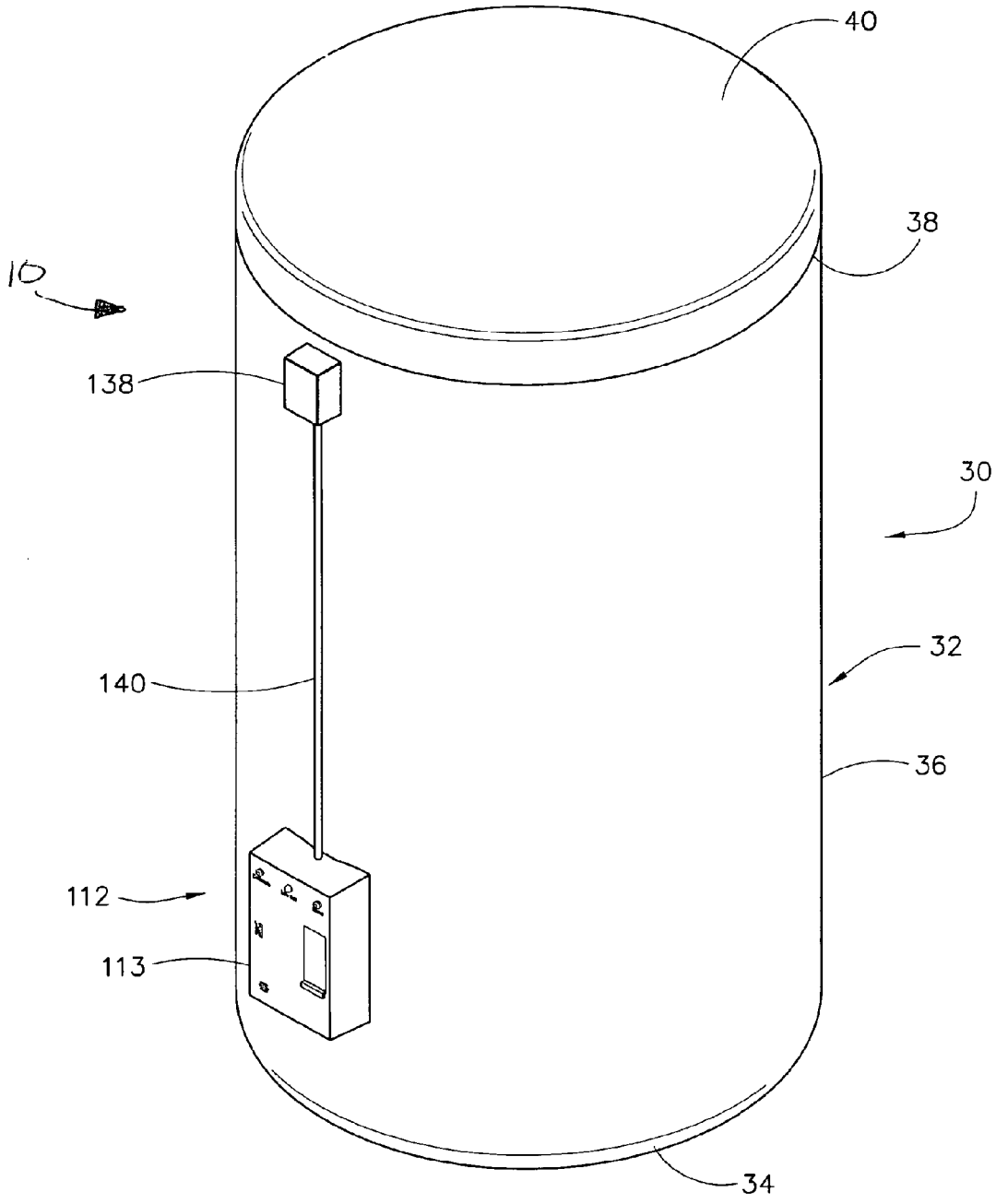
FIG. 17 is an isometric view of the system of the present invention having a third embodiment of the monitoring device.

In an alternative construction to the embodiment of the device 112 shown in FIG. 17, the device 112 can incorporate a dedicated reference capacitance value device 138 that is fixed to the sidewall 36 of the tank 30 adjacent the upper end 38. The device 138 is constructed and operates identically to the device 112 and is positioned to enable the device 138 to continually obtain a capacitance value for the tank 30 at a location where no salt is present within the tank 30. Once obtained, the device 138 can transmit this value to the monitoring device 112 via a conduit 140, or other suitable wire or wireless connection, in order to continually supply and/or update the reference value used by the monitoring device 112. Further, in addition to sensing a capacitance value based on the presence of solid or granular salt within the tank 30, the device 112 can be configured to be capable of sensing a capacitance value based upon the concentration of ions within the brine solution held in the tank 30 as a result of dissolved salt to provide an indication of salt within the tank 30. Once the salt is depleted, the brine solution lowers in the tank and the device will sense the absence of salt at the attachment point.

Figure 17A:
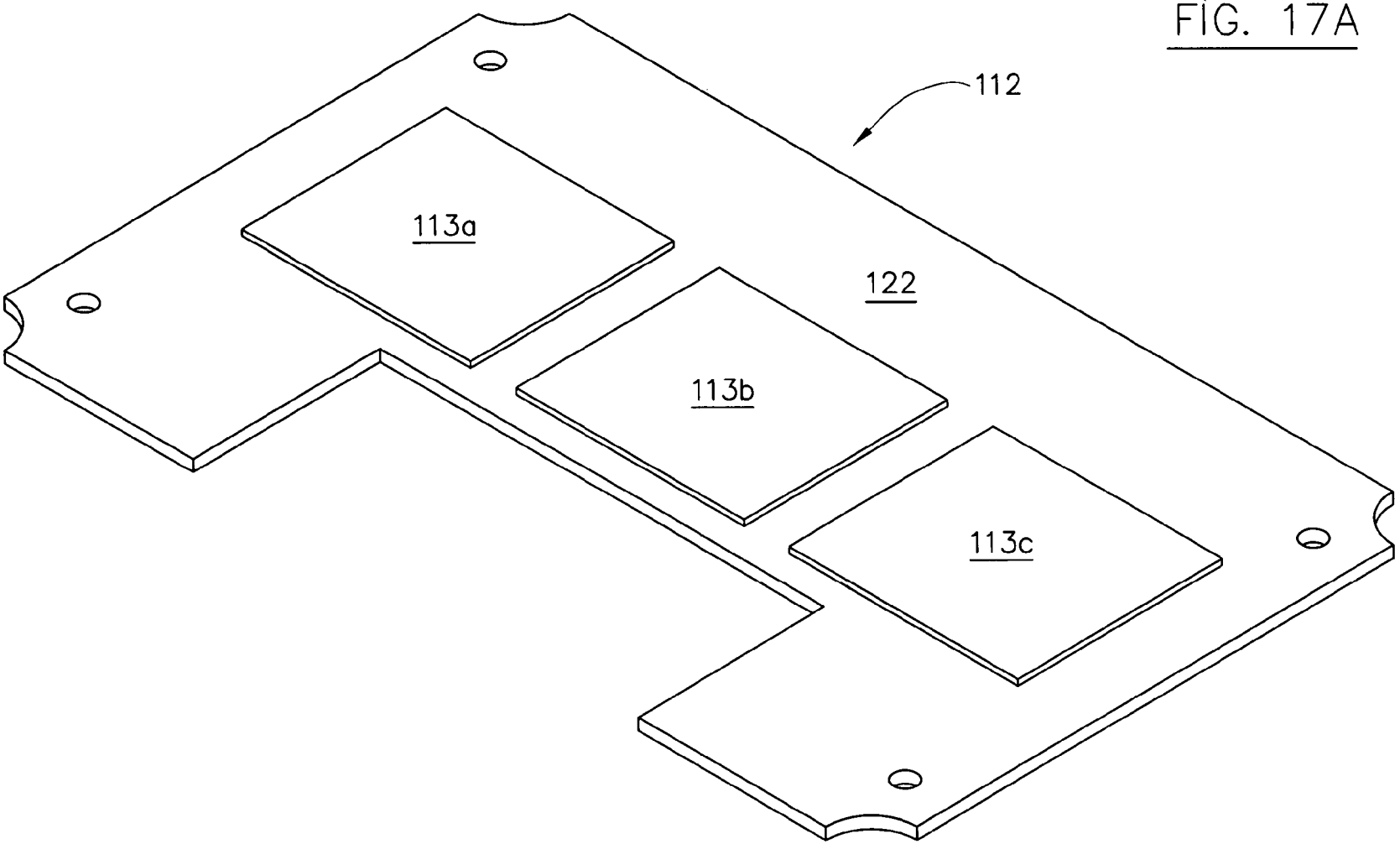
FIG. 17a is an isometric view of a plate of another embodiment of the monitoring device of the present invention.

As shown in FIG. 17a, in lieu of the capacitor connected by a cable, the base circuit 122 of the device 112 preferably has two capacitation plates 113a,b and one ground plate 113c. The plates preferably are the same size.

Figure 18:
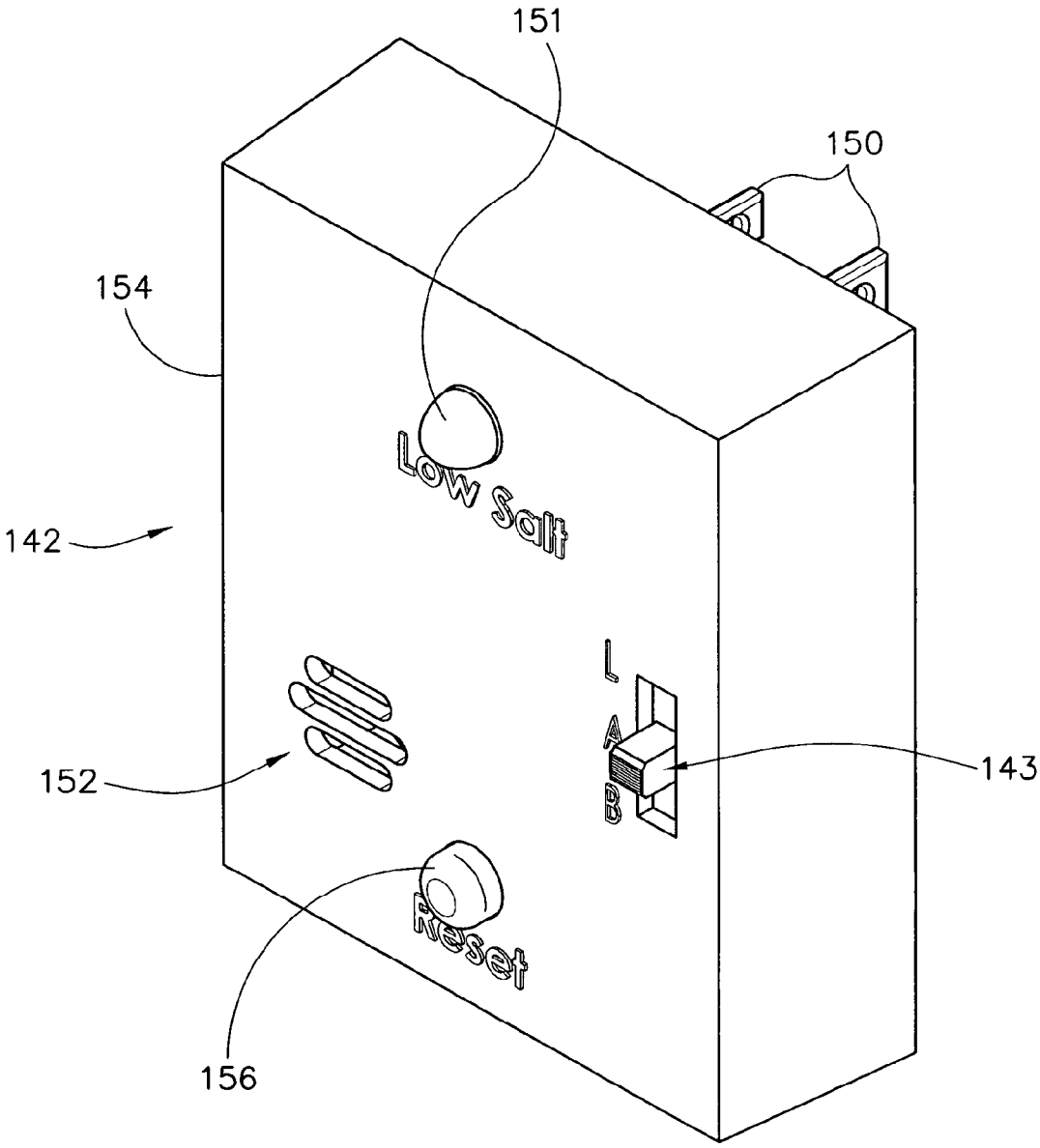
FIG. 18 is an isometric view of an alarm mechanism utilized with the monitoring device of the present invention.
Figure 19:
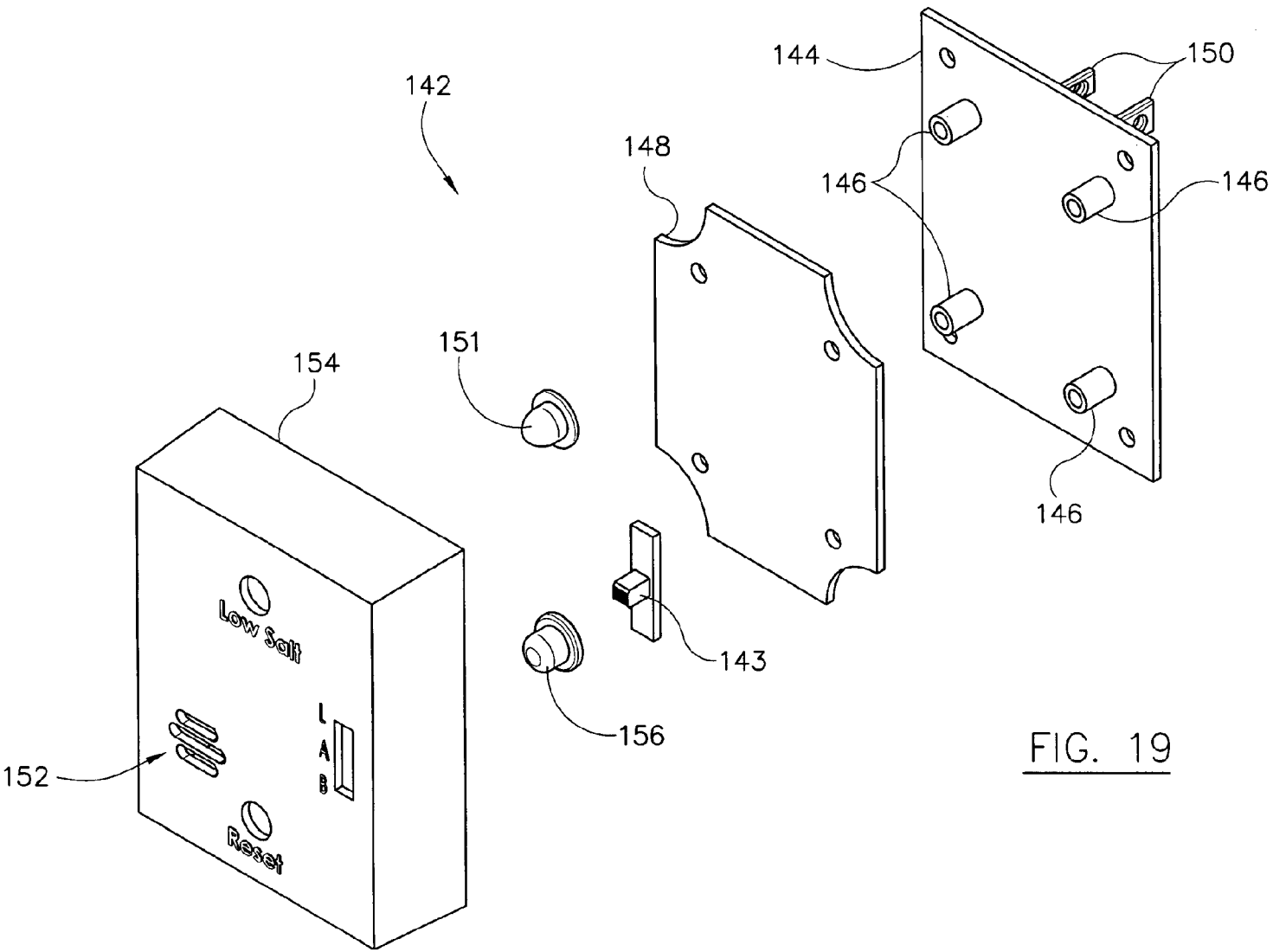
FIG. 19 is an exploded, isometric view of the alarm mechanism of FIG. 18.

With regard to each of the aforementioned embodiments of the invention, in addition to the incorporation of the lamps 108 and 132 and speakers 110 and 134 on the respective housings 80 and 114, the monitoring devices 42 and 112 can utilize a salt level indicator, e.g., a remote alarm 142, best shown in FIGS. 18-19, that can be spaced from the device 42 or 112. The indicator 142 includes a receiver (not shown) that can receive a signal transmitted from the device 42, 112 in a known matter, that causes the alarm 142 to activate and emit the audible and/or visual signal for an individual. The remote alarm 142 includes a base 144 having mounting stems 146 to which are secured a circuit plate 148 using fasteners (not shown). The base 144 may include a pair of prongs 150 that are operably connected to the plate 148 and engageable with a power source, e.g., a standard electrical outlet (not shown) in order to provide the power to the remote alarm mechanism 142. Alternatively, the power source may be a battery source for placement anywhere. After switching on the alarm 142 using a control switch 143, when a monitoring device 42 or 112 determines that the level of the salt within a tank 30 has reached a lower limit, the device 44 or 112 emits a signal that is received by the remote mechanism 142 which causes the mechanism 142 to actuate a lamp 151 and/or speaker 152 disposed on a housing 154 enclosing the circuit plate 148 and attached to the base 144 in order to provide a signal to an individual that the salt 202 within the tank 30 needs replenishing. Also, the alarm 142 includes a reset button 156 on the housing 154 so that the individual may disable the operation of the lamp 150 and/or speaker 152 after receiving the alert from the device 42 or 112, for example, pushing once disables selected audible alarm, pushing and holding disables audible alarm and light. The system will re-notify if salt is not added to the tank. The alarm 142 can be spaced a significant distance from the device 42 or 112, and in any direction, for example, a distance of between ten (10) feet and one hundred fifty (150) feet and with about 100 feet being most common.

Another embodiment of the inventive system 10 is shown in FIGS. 15-19. Best seen in FIG. 17, system 10 includes a monitoring device 112 that is preferably attached to exterior sidewall 36 of brine tank 30 at a measured level up from the bottom 34 of the tank 30. The device 112 may be attached through the use of double sided tape, or adhesive, or a hook and loop system (Velcro) (not shown). First, the device 112 is placed on the empty portion of the brine tank 30 where salt media is not present, and a calibration button 136, is pressed (see, e.g., FIGS. 15-16). A sensing unit 113 preferably within device 112 senses the capacitance in the calibration position which is stored in memory (not shown). An additional option would use a secondary sensing unit 138 attached to the primary sensing unit 113 by an electrical ribbon cable 140. The secondary sensing unit 138 preferably is attached near top portion 38 of the tank 30, as shown. The monitoring device 112 is then attached to the lower portion of the brine tank 30 at a measured distance from bottom portion 34, where the substance, e.g., salt media, is present.

Standard residential water softeners regenerate (i.e., use salt) on a repetitive schedule, the length of the cycle is dependent on the amount of water that is used in the residence. This interval varies in increments of days (longer or shorter depending on water use). The monitoring device 112 only needs to test for the absence of salt media at the level where the device 112 is attached at an interval that is less than or equal to twice the interval that it regenerates. Therefore, the unit has the capability through the use of programming or a switch (not shown) for the user to select the intervals that they want the device or unit to check for the absence of salt media. This setup dramatically increases the life of the battery that runs the sensor/sending unit 113. Based on the selection of interval, the monitoring device 112 tests for capacitance change, e.g., the absence of salt media at a certain level, using only the sensing unit 113 with the stored capacitance value discussed above. Alternatively, the monitoring device 112 may compare the capacitance level at the secondary sensing unit 138 to that at the primary sensing unit 113. If the device 112 detects the presence of salt media, it will perform multiple additional tests, and if the results are the same, the device 112 will not send an alert signal to the low salt indicator. If the device 112 detects the absence of salt media at the level at where it is attached, it will again perform multiple tests. If those test results are the same, the device will trigger an alert signal as described above.

The monitoring device 112 is capable of giving a warning, e.g., an audible alert (A) at the tank only, visual alert (L) at the tank only, both an audible and visual alert (B) at the tank, and or a combination of the same through a remote receiving unit 142. (See, e.g., instructional indicia L, A, B near switch 128 in FIG. 15). The user can input this into the device 112 or choose the alert method through a selector switch 128 (best shown in FIG. 16). They may also have a built in transmitting unit (not shown) that can transmit a wireless remote signal to a receiving unit or low level indicator 142, as shown in FIG. 18, plugged into a standard 110 volt outlet or power source located within a set distance of about 100' within the residence or building.

The audible warning or alert (A) at the monitoring device 112 or receiving unit 142 are heard through preferably a miniature speaker 152 or piazzo buzzer and the visual alert is done through preferably the use of light (L), e.g., LEDs. The alert type is selectable, e.g., by switch 128, by the user at the monitoring device 112 and the receiving unit 142. Not only does this allow the user to select options they may prefer, it also gives options for those that are hearing or seeing impaired. This option also gives the manufacturer the ability to sell a monitoring device 112 that only works at the brine tank or selling one that adds on as an option the remote receiving unit 142.

If the audible alert only type signal is chosen, the alert can be silenced by pressing and holding the reset button 156, on the receiving unit 142 and then button 130 on the monitoring device 112 (see, e.g., FIG. 18). If audible and visual alerts are chosen, pressing and holding either reset button 156, 130 will only silence the audible alert continuing to notify the user of the low salt condition through a light or LED 132, 151, until the low salt condition is corrected by adding salt. In either case, if the salt is not replenished within the chosen sense interval (e.g., one hour) after the initial alert, the monitoring device 112 will again trigger an audible and visual alert. This will repeat until the low salt condition is corrected. After the low salt condition is corrected, the device 112 preferably automatically resets itself to a normal operation condition. Note, e.g., the receiving unit or signaler 142 preferably receives a wireless transmission from the detection mechanism monitoring device 112.

The monitoring device 112 is also capable of giving off a separate distinguishable audible and visual alert notifying the user of a low battery condition. In one embodiment, the device 112 will also transmit a separate signal to the receiving unit 142 to give off the same low battery alert. The alert may be cancelled by the same procedure as canceling the low salt alerts. If the condition is not corrected by replacing the battery, the unit will also preferably resend to the remote receiving unit 142 the "low battery" condition signal, at the same intervals that it tests for low salt conditions.

Figure 20:
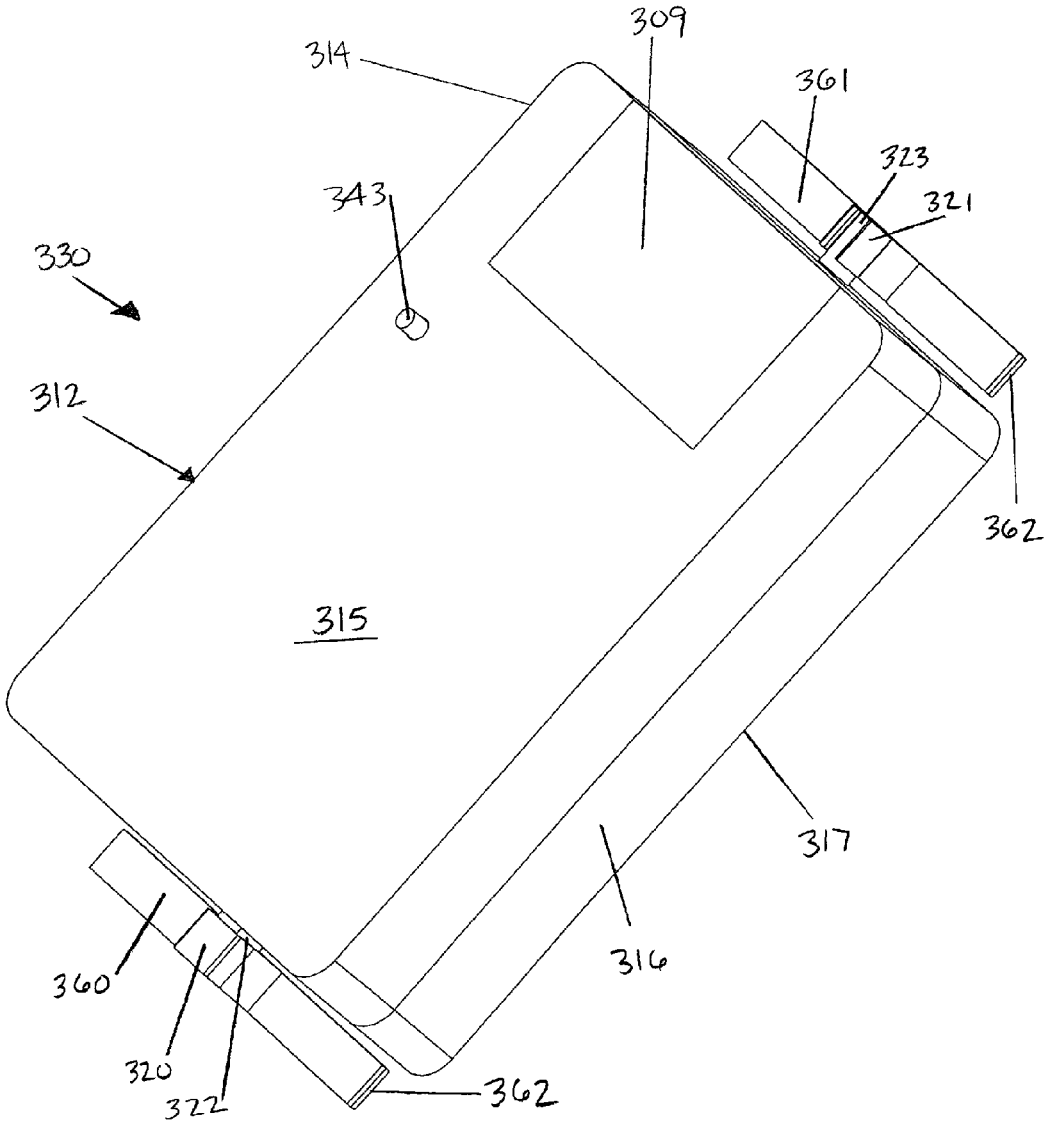
FIG. 20 is an isometric view of another embodiment of the monitoring device of the present invention.
Figure 21:
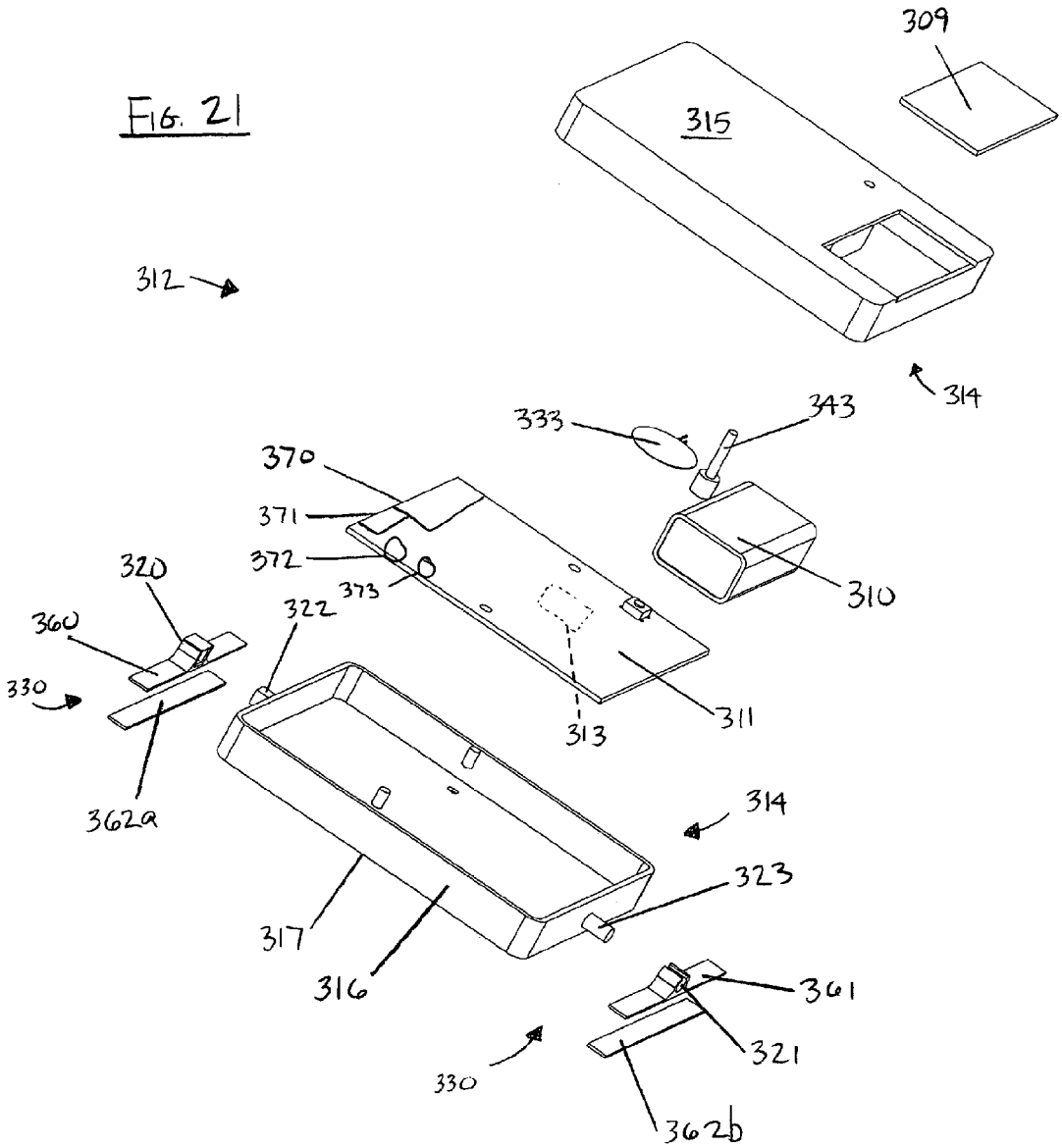
FIG. 21 is an exploded, isometric view of the monitoring device of FIG. 20.
Figure 22:
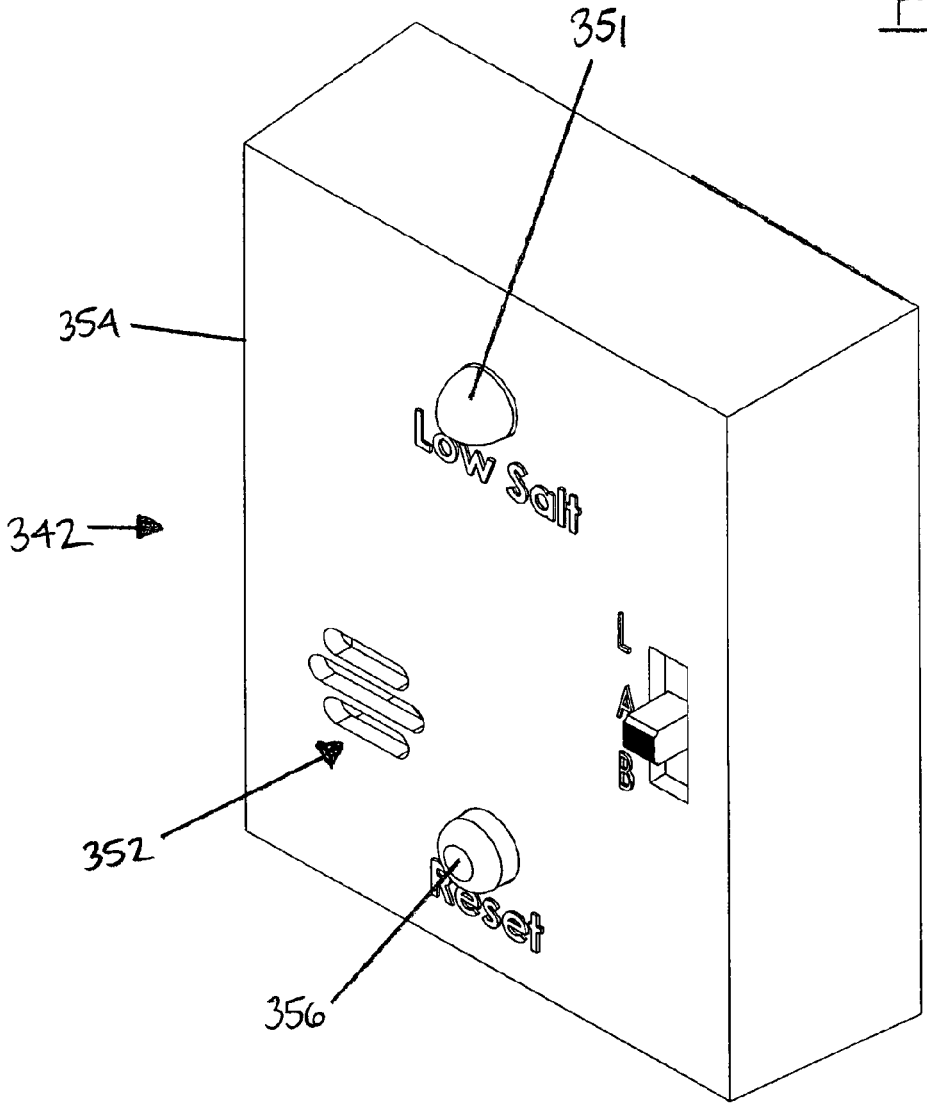
FIG. 22 is an isometric view of an alarm mechanism utilized with the monitoring device of the present invention.
Figure 23:
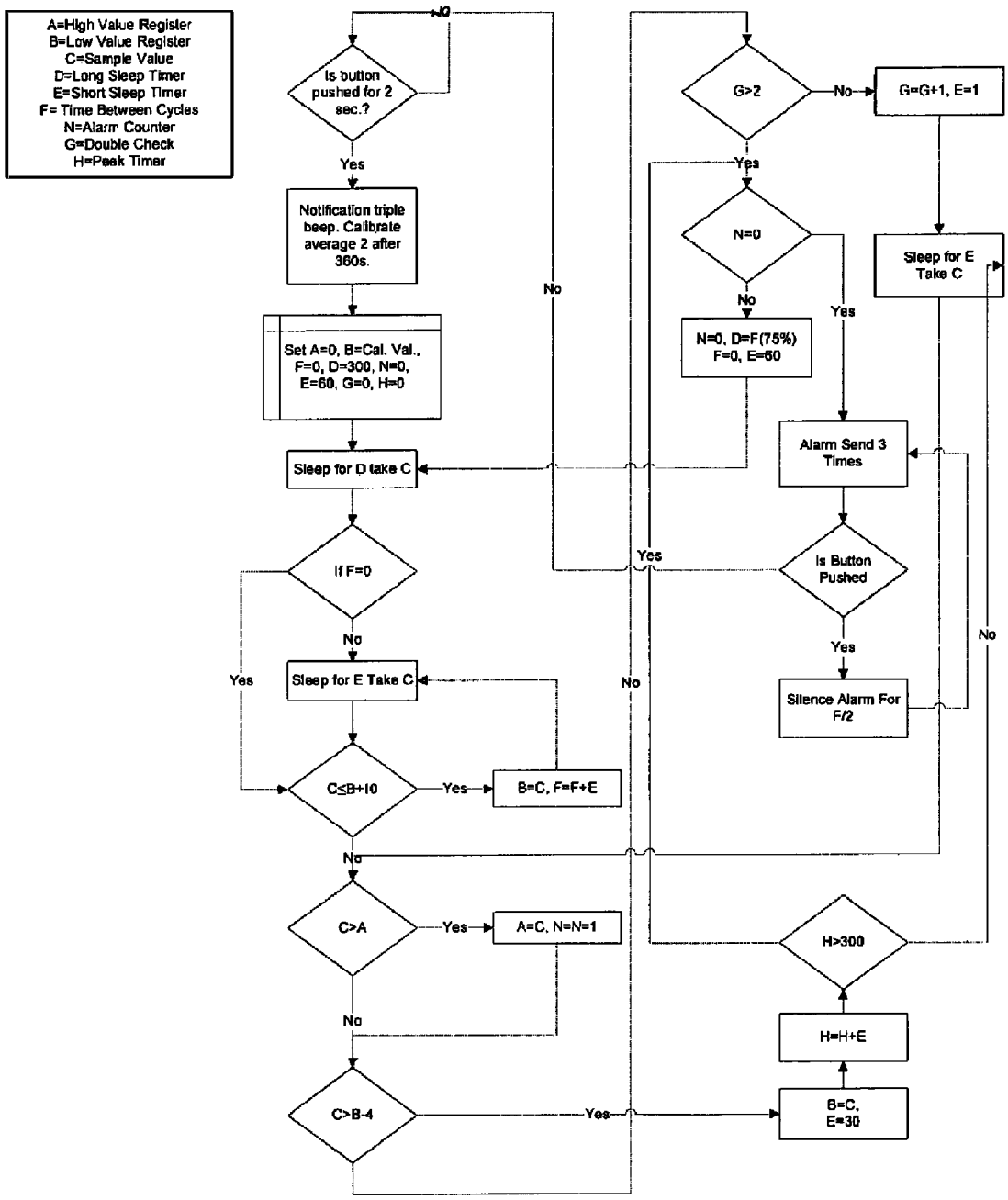
FIG. 23 is a flow chart showing steps performed by software of the present invention.

Referring now to FIGS. 20-22, a number of further embodiments of the present invention use software along with the capacitive-based system to reliably detect the level of salt within the tank. A computer chip 319 in the monitoring device 312 may be programmed with software 370. Thus, the device may have hardware and software components.

Figure 29:
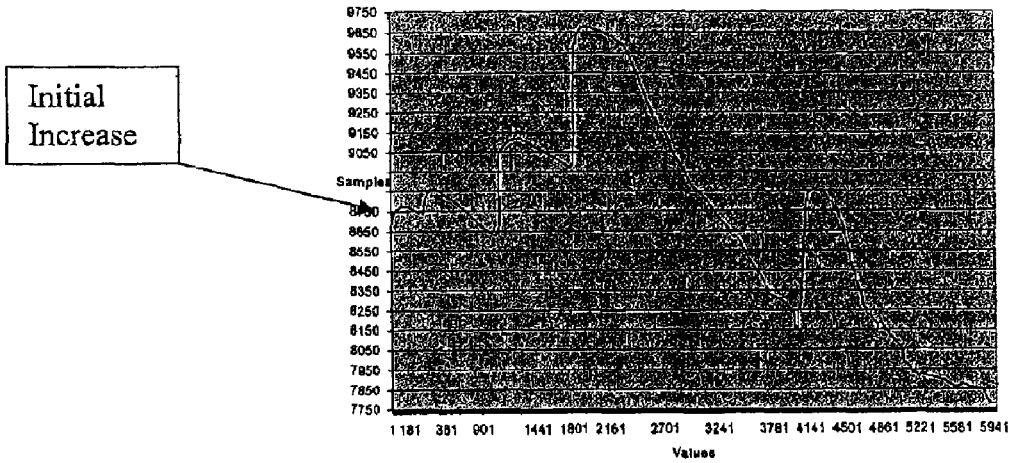
FIG. 29 is a graph showing the initial increase after starting the calibration sequence for one embodiment of the invention.

Different softener cycles contribute to unique problems in sensing with capacitance. The capacitive values may change dramatically during the different cycles due to factors other than the level of the salt decreasing. For example, when producing brine, the tank may contain solid salt or other solid material or media, brine solution, aqueous material like fresh water turning into brine, very little water or brine, salinic humidity, gases and salt build up that make it difficult to accurately and repeatedly sense the level of salt in the tank. The capacitive values can go up by simply removing the cover from the tank and releasing gases and/or humidity from the tank. The values can go up while salt or other media is added to the tank and then go down. This causes difficulties when trying to set calibration points for determining alarm thresholds for capacitive sensing devices or finding the proper time to catch the changes in capacitance. See, e.g., the initial increase after the calibration sequence was started as shown in FIG. 29.

In one embodiment shown, the monitoring device 312 includes software 370 that determines the proper threshold 372 for setting the alarm point in dealing with the increasing and decreasing values of capacitance. The capacitive values are monitored during calibration and the software waits until the value peaks and/or goes down after the initial reading to prevent getting a false threshold. The threshold 372 can be a percentage increase over the calibration threshold determined via a calibration mechanism 373. This is done through the formula or software program shown below.

A=Capacitive Value
B=Place Holder
T=A period of Time
Check A
Let B=A
Check Time
Wait T
Check A
If A>B, Let B=A Goto Check Time
End
B=Calibration value or the threshold.

Figure 30:
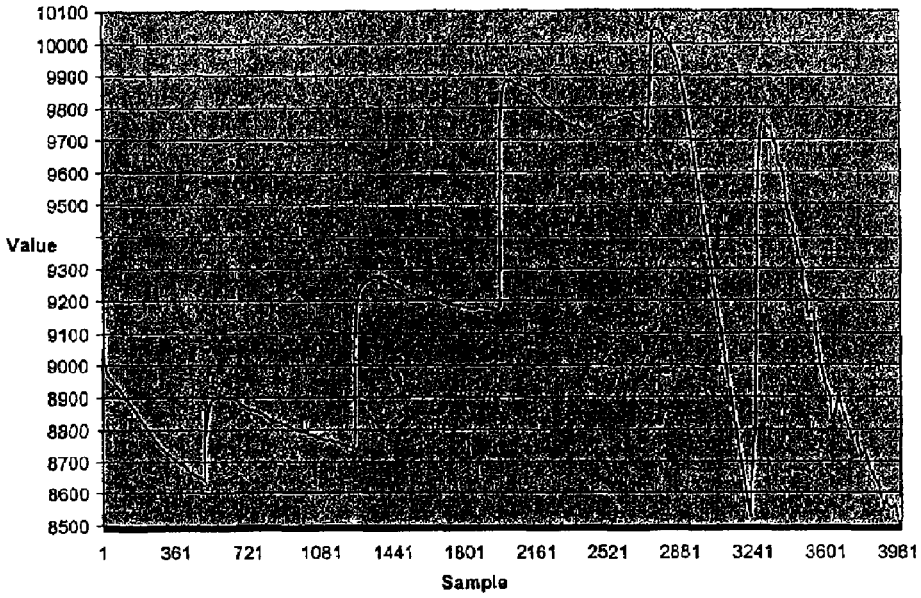
FIG. 30 is a graph showing various water softener values for one embodiment of the invention.

Another embodiment includes software 370 that permits a user to place the monitoring device 312 on the tank without the need to set a threshold 372 for the device 312. During the normal cycles of the water softener making, using and remaking brine, the capacitive values within the tank will go through peaks and valleys. The device 312 has software 370 on a chip or PC board 311 that makes use of this and either looks for peaks to be less than or equal to the previous peak during the brining cycle. One example of the steps taken by the software 370 is seen in the flowchart shown at FIG. 23. During the cycles of the softener, the peaks will either reach a maximum value that will either remain near the peak during subsequent regenerations, or decrease in value after the maximum peak has been reached. See FIG. 30 as an example. The software 370 could also be written to learn the differences between initial calibration values and peak values to optimize alarm points.

The software 370 could also be written to learn the differences between initial calibration values and peak values to optimize alarm points.

Another embodiment preferably includes software 370 to solve the problem of proper placement of the monitoring device 312 on the tank. The peaks and valleys of the capacitive values mentioned above are time and position dependant. If the device 312 is placed very low on the tank in the brine solution, the time between peaks and valley can be shorter and the percentage changes in capacitance can be smaller. If the device 312 is placed higher on the tank and/or out of the brine solution, the time between peaks and valleys can be longer and the capacitance changes can be larger. The problem is if the time between checks of capacitive values is too long, and or the percentage increase or decrease that is looked for in the software 370, the actual change in capacitance can be missed. This often causes the system to fail to alarm. This is solved by giving the user the use of a variable-sensitivity setting. This is done through the use of timers 371 preferably in the software 370, and with different values associated with percentage increases or decreases associated with each timer value. The user can choose from multiple sensitivities which in turn may change the amount of time between sensing episodes and or the amount of increase or decrease in capacitance relative to alarm threshold settings. This allows for increased life of the power source, e.g., battery 310, if lower sensitivity settings are chosen. It also allows for detecting smaller changes in capacitance on varying locations on the tank. An example of the sensitivities and the percentage increase or decrease is shown below:

T=0.5 hours and 0.005% of calibration value
T=1 hour and 1% of calibration value
T=1.5 hours and 2% of calibration value
T=2 hours and 4% of calibration value
T=4 hours and 8% of calibration value
T=8 hours and 12% of calibration value The user can choose the sensitivity through the use of a button or switch 343 that allows them to select the sensitivity. The receiving unit 342 shown in FIG. 22 gives audible alerts via a piazzo buzzer 333 to the level of sensitivity that is chosen.

Another embodiment includes software 370 that has the ability to measure the time between peaks and valleys of the capacitive values. This is useful in that it would allow the unit to learn and set the optimum time between sensing to increase battery life and to make the need to setting sensitivity unnecessary as the device will learn the proper interval. This would also allow for the monitoring device 312 to determine and average the preferred amount of time between regeneration cycles and also learn on average how often the container needs to be filled with salt or other media. Once the device 312 has this information, it can go into a sleep mode for longer periods of time, and decrease energy use. This can also be used as a secondary means of determining and/or tracking time between tank regenerations. The flowchart on FIG. 23 also shows the preferred steps needed to perform this task.

Another embodiment includes software 370 to notify the user of a "dirty" tank condition or failure of the softener to regenerate. In such instances, a "dirty" tank condition includes salt or other media buildup on the inside of the salt tank that may render the sensing unit 313 useless. In other instances, the water softener may stop working and/or not regenerate at the appropriate intervals. In using the software 370 mentioned above, one can set a maximum time that the system has to see at least one peak or valley change in capacitive values. If one is not seen during this period of time, the monitoring device 312 notifies the user via an alarm of a dirty tank condition and/or faulty water softener. It should be noted that the above software functions could be accomplished thru other means such as electrical circuitry and/or mechanical means.

These preferred embodiments are configured to be connected to an irregular surface such as a cylindrical water softener tank via container attachment means 330 as shown in FIG. 21. The container attachment means 330 preferably attaches a housing 314, e.g., sealed plastic enclosure, to the container 30. The housing or enclosure 314 has a top piece 315 with battery cover 309 and bottom piece 316. The battery 310, PC board 311 and capacitive sensing unit 313 are contained within the housing 314. The container attachment means 330 preferably comprise tabs on each end 322, 323 of the housing 314 connected to flexible mounting brackets 360, 361 that are adhered to a container or tank (not shown).

In the embodiment shown, tabs 322, 323 are mounted directly to the bottom housing piece 316 and in another embodiment not shown, they are removable. Tabs 322, 323 are offset from the bottom 317 of the enclosure 314 by the thickness of double side adhesive 362a, b to allow for the bottom enclosure piece 316 to contact the surface of the container. Mounting brackets 360, 361 are thin and flexible enough to conform to irregular shapes, while still allowing circuitry 311 within the enclosure 314 to maintain it natural shape, that being flat.

In an embodiment where the enclosure 314 is removable such as shown, a round male member or tab 323 is mounted on one end of the enclosure 314 and a rectangular protruding male member or tab 322 is mounted on the opposite end. The flexible mounting bracket 361 for the round tab 323 is designed to allow the round tab 323 to snap into a generally circular receiving female member or slot 321. The flexible mounting bracket 360 for the rectangular tab 322 is designed to allow the tab 322 to slide into a rectangular slot 320 in the flexible mounting bracket. The combination of the two tabs 322, 323 permits the easy removal and reattachment of the monitoring device 312 from the surface of the tank. Attaching the enclosure 314 requires sliding the rectangular tab 322 into the slot 320 of the corresponding flexible mounting bracket 360, and then snapping the round tab 323 into slot 321 of the corresponding bracket 361. The reverse sequence will remove the enclosure 314. When engaged, the rectangular shape of tab 322 and slot 320 prevent rotation of the enclosure 314 on the mounting surface. It is important to prevent any rotation of the enclosure 314 to ensure optimum and repeatable measurement by the monitoring device 312.

Another means of attaching the enclosure to an irregular surface is by the means of a hook and loop fastener (also known as Velcro). Indentations in the bottom 317 of the enclosure 314 are provided to compensate for the thickness of the combined hook and loop pieces (not shown) such that the housing or enclosure 314 is mounted flush with the surface. This allows for the enclosure 314 to be in close contact with the surface of the tank. The hook and loop pieces are preferably flexible enough to allow for connection to irregular surfaces.

Figure 24:
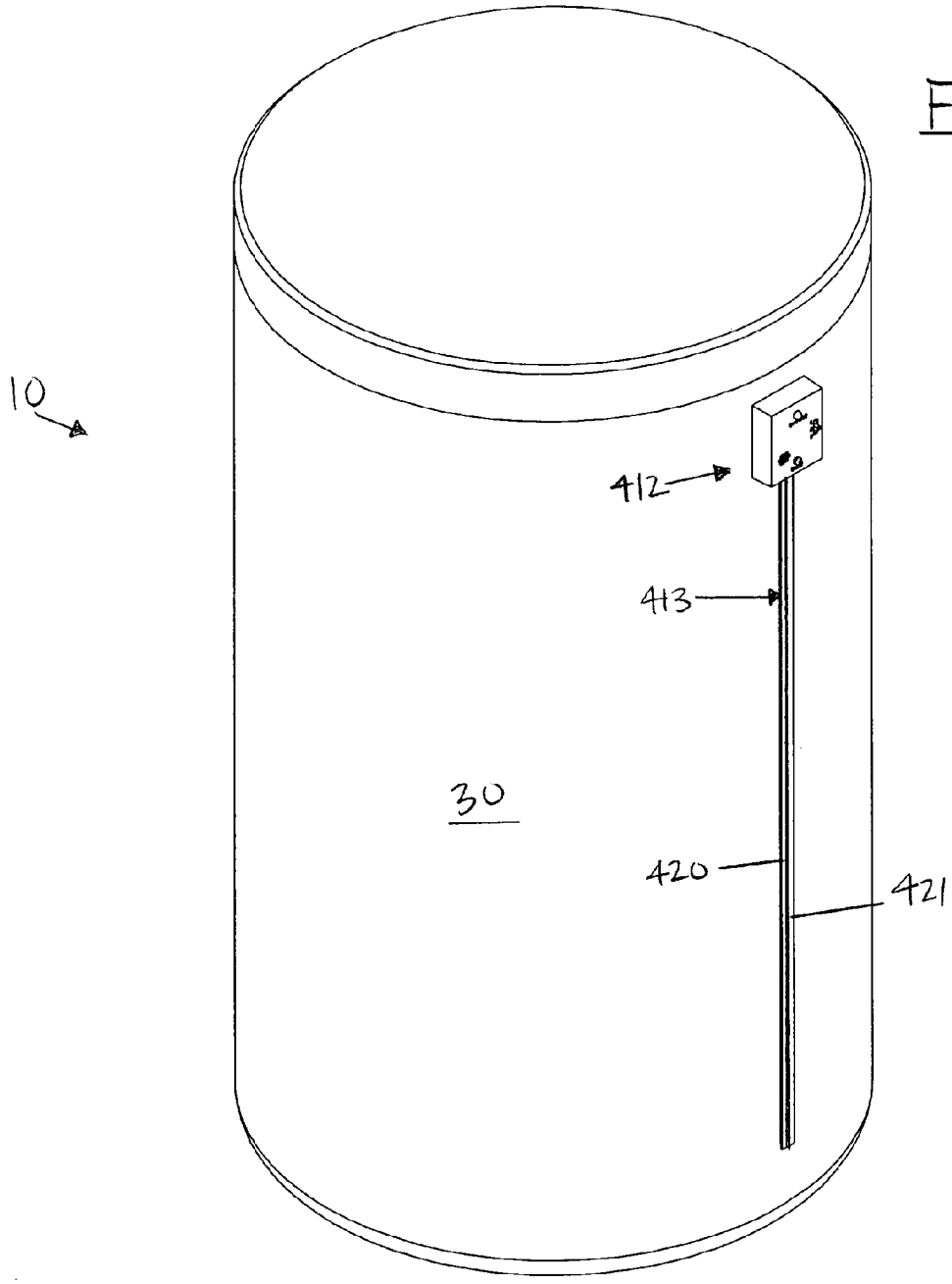
FIG. 24 is an isometric view of the system of the present invention having another embodiment of the monitoring device.
Figure 25:
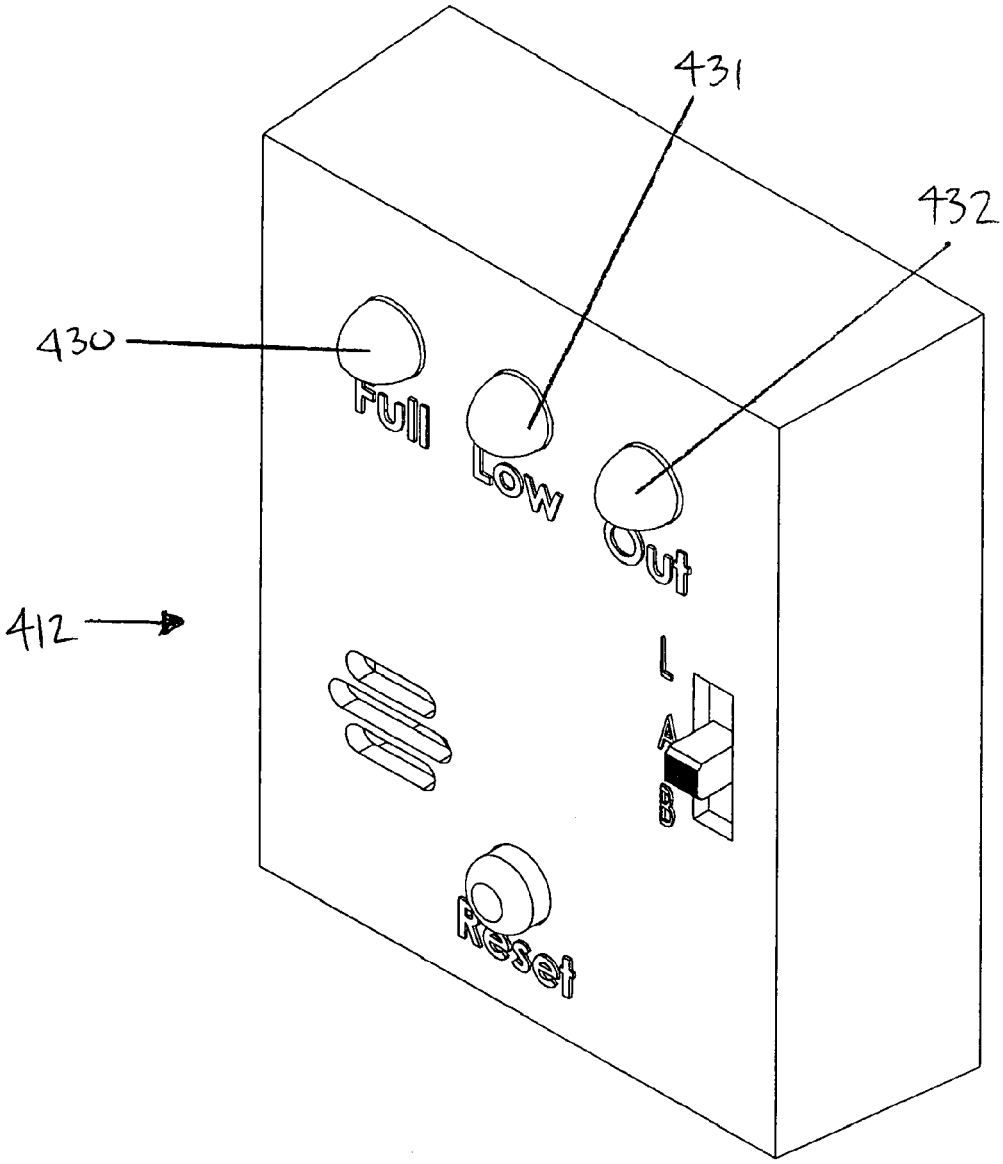
FIG. 25 is an isometric view of the monitoring device of FIG. 25.

Referring now to FIG. 24-25, a further embodiment consists of a system 10 with a capacitive-based monitoring device 412 and sensing unit 413 in an alternate arrangement. The system 10 includes a capacitive plate 420 that runs in the vertical direction of the brine tank 30. The capacitive plate 420 is preferably imbedded in plastic along with a ground plate 421 that also runs in the vertical direction of the brine tank 30. The length of the plates 420, 421 is determined by the height of the tank 30 and can be cut to length accordingly. The plates 420, 421 are connected to the monitoring device 412 through wires or other known methods. The capacitive plate 420 and ground plate 421 can alternatively be attached to the brine tank 30 by double sided adhesive (not shown) or other means. Alternatively, the plates 420, 421 may be located on the inside of the tank 30 or molded or formed directly into the tank 30 itself. When the brine tank 30 is filled with salt or other media, the capacitive readings from the plates 420, 421 are scaled accordingly by the monitoring device 412 to determine the level of substance in the tank 30. As the salt or other substance is depleted, the readings will gradually increase and can be used as feedback. As shown in FIG. 25, the monitoring device 412 will preferably have lights or LEDs to indicate or display a discrete value such as full 430, low 431, and out 432. In another embodiment, the display will be a variable reading similar to a fuel gauge in a car.

Figure 26:
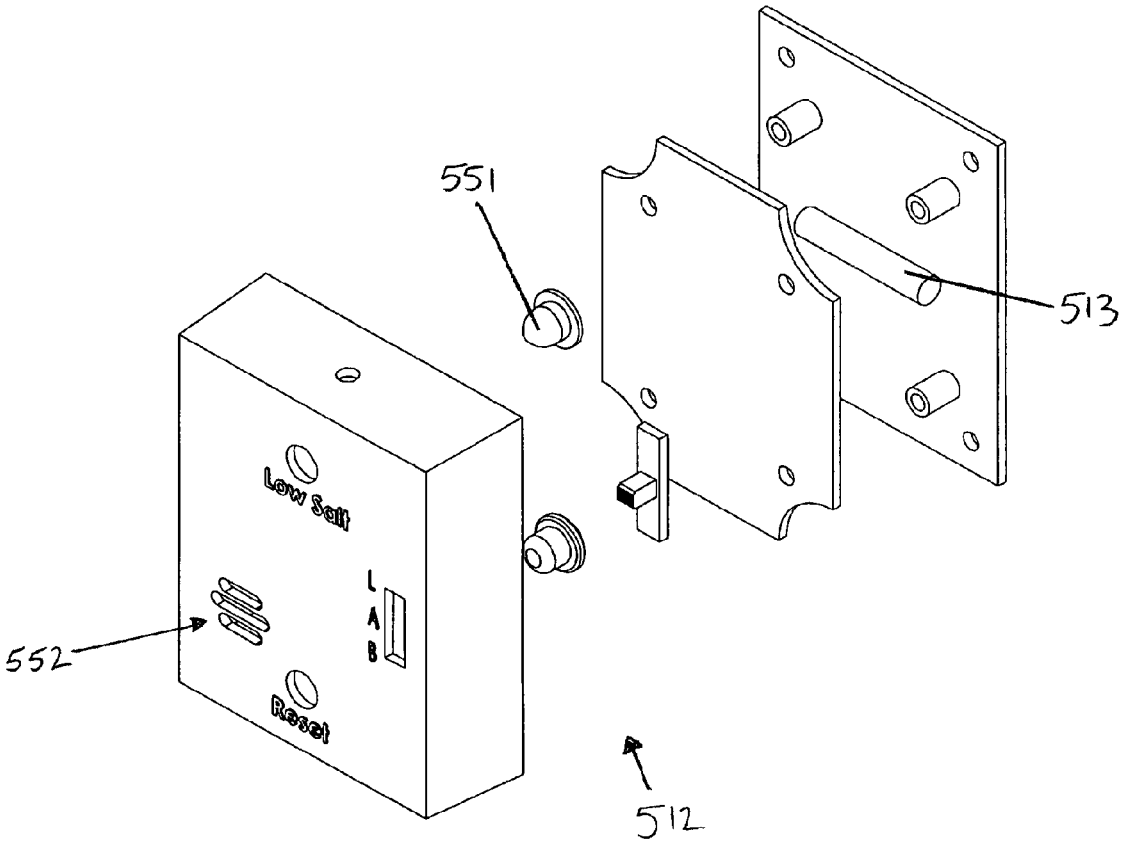
FIG. 26 is an exploded, isometric view of another monitoring device of the present invention.

Referring now to FIG. 26, a further embodiment of the monitoring device of the present system is shown. The monitoring device 512 is configured to sense the level of the brine solution through an inductance sensing unit 513 that is preferably contained therein. When salt is dissolved in the water in the tank 30 to form the brine solution, the solution is capable of being sensed by the inductance sensing unit 513, which is similar to those used in a typical commercially available metal detector. This is particularly effective when salt blocks are used in lieu of granular salt material. The blocks generally are placed further away from the wall of the tank 30 than granular materials so sensing through capacitance is less effective. The salt blocks however displace fluid raising the upper level of the brine solution (i.e., increasing the volume). When the salt blocks are depleted, the solution level lowers a measurable amount (i.e., decreasing the volume). The monitoring device 512 preferably is placed on the outside of the tank 30 between the upper level of the brine solution when the salt is added and the level it drops to when the salt is depleted. The monitoring device 512 detects the absence of salt when the level drops below the inductance sensing unit 513 and notifies the user of the low salt condition. The monitoring device 512 can also be placed at a level low enough on the tank 30 so that it is always above the lowest level of brine solution/water. This is beneficial to the user who does not know what the upper and lower limits are. In this case, the sensing unit 513 would sense when the salt and brine solution are completely depleted, leaving only water. The unit 513 would sense this through the inductance circuit and notify the user of the no salt condition.

Figure 27:
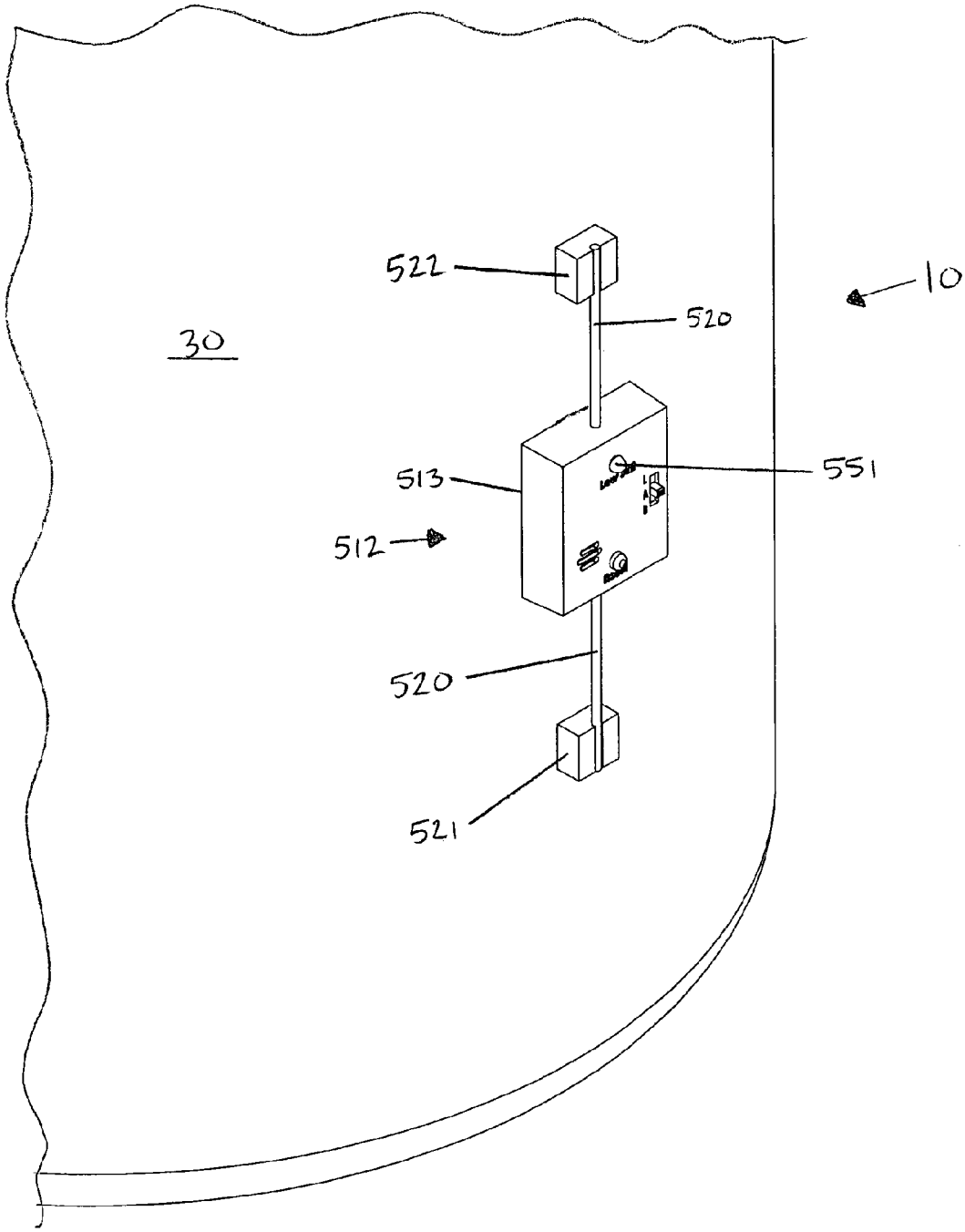
FIG. 27 is an isometric view of the system of the present invention having another embodiment of the monitoring device.

Referring to FIG. 27, the system 10 includes the inductive-based detection mechanism or sensor 513 of FIG. 26 with a means to slide up and down the tank 30 is shown. The sliding means or member preferably includes a shaft 520 fastened to the tank 30 on either or both ends, preferably by clamps 521, 522. Monitoring device 512 is then preferably mounted to the shaft 520 via a receiving cavity. After the tank has formed a brine solution, the device 512 is slid down until a light 551 or other means of notification comes on to indicate that the inductance and the level of the brine solution has been found. The monitoring device 512 is then secured to that position by a plastic set screw or other known means. Such a sensor may be referred to as a position based sensor.

Figure 28:
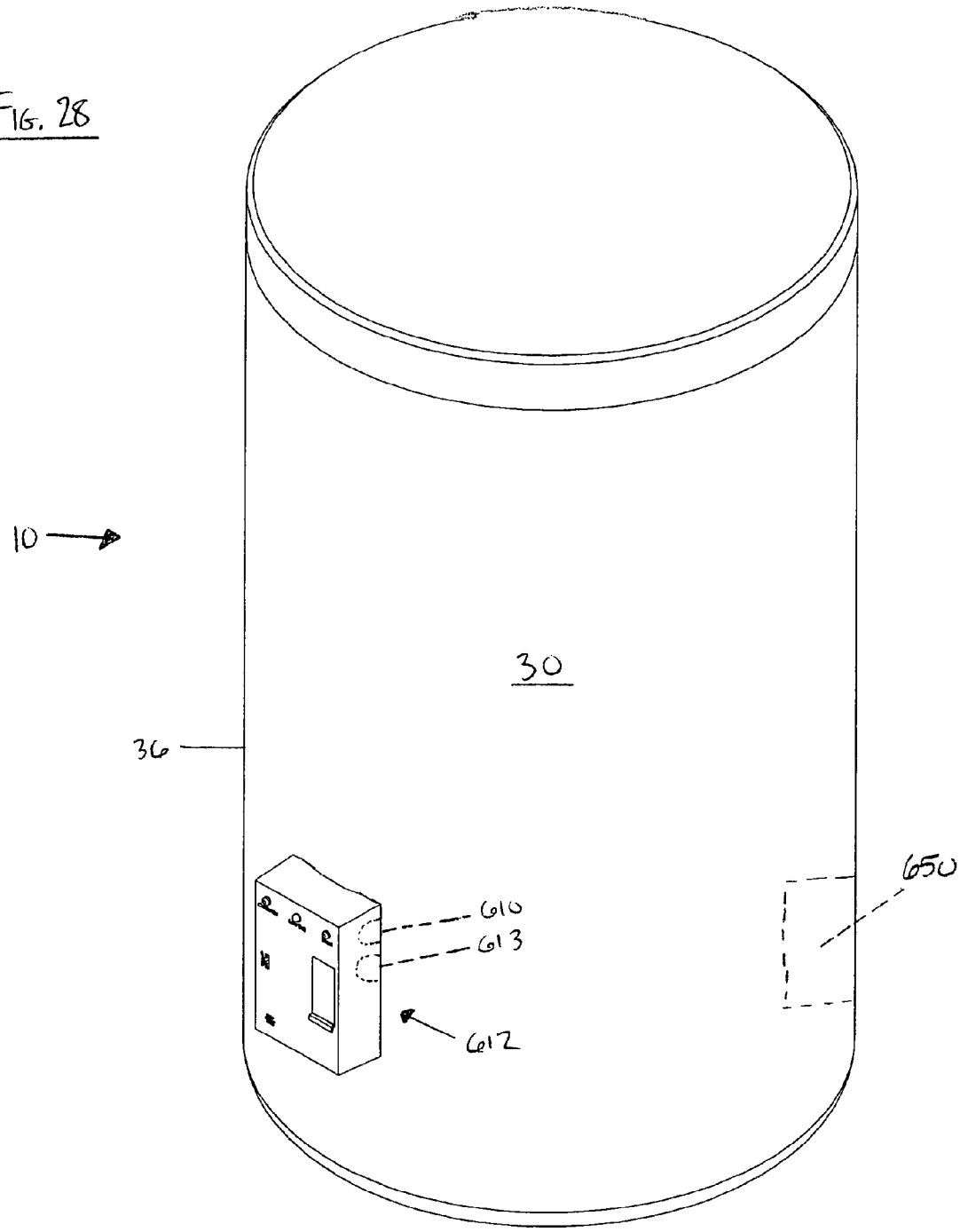
FIG. 28 is an isometric view of the system of the present invention having another embodiment of the monitoring device.

Referring to FIG. 28, another embodiment of the system 10 is shown that utilizes an infrared wave or beam emitter and detector. The monitoring device 612 is attached to the outside of the tank 30. An infrared beam emitter 610 generates a beam that passes through the tank wall 36. If salt or other infrared reflective media is present in the tank 30, the infrared beam will reflect off of it and be detected by the monitoring device 612 via an infrared sensing unit or wave detector 613. Once the level of the salt decreases past the level that the detector 613 is located on the tank 30, the infrared beam will no longer reflect back. The monitoring device 612 will then notify the user through a visual and/or audible alert notification as described above. Another embodiment consists of a second infrared sensing unit (shown in phantom as 650) that is attached to the opposite side of the tank 30 from the infrared beam emitter 610. When the level of salt is higher than the emitter 610, the salt will block detection by the second sensing unit 650. Once the level of salt falls below the level of the emitter 610 and second sensing unit 650, the infrared beam will pass through the tank into the second sensing unit 650, thereby enabling detection of the low salt condition. The use of the second sensing unit 650 will also allow for notification of a "dirty" tank condition where salt build-up on either wall of the tank over a certain period of time can be detected. This notification does not work when reflecting the infrared beam off the salt back to the detector 613.

In a final embodiment not shown, the monitoring system can utilize an emitter as disclosed in McEwan U.S. Pat. No. 5,512,834, which is herein incorporated by reference. Specifically, the beam source or emitter sends out waves of low frequency electromagnetic radiation (radio waves) into a tank, which bounce off of the salt within the tank for reflection back to a wave detector in a monitoring device. The angle of reflection of the waves to the device, and the duration of time for the waves to be emitted and reflected back to the device can be used by the detector to determine the amount of salt within the tank. If the amount or level is below a lower limit, the device can activate an audible or visible alarm, as described previously. The sensing unit can be positioned anywhere on the tank or cover, so long as the device is properly calibrated for the position it is in, in a known manner.

While the preferred embodiments and best modes of utilizing the present invention have been disclosed above, other variations are also possible. For example, instead of a water softener salt tank, the system 10 may include any type of storage container used to hold an amount of material within the container. Further, while the structural components of each device in the system 10 are preferably formed of a non-corrosive, sealable, insulating plastic material for use with water softeners, any other suitable rigid material, such as a metal, could be used. Also, while the calibration device and alarm are shown as being single units used with a single device, these items can be configured to transmit or receive signals to and from multiple units and devices in order to monitor several containers or tanks simultaneously.

Various alternatives are contemplated as being within the scope of the following claims which particularly point out and distinctly claim the subject matter regarded as the invention.

The invention claimed is:

1. A salt sensing unit for a water softener tank comprising:
a first housing enclosure that connects to the outside of the tank without the need for drilling of any holes and is configured to mount to any shape and size of tank;
[a low level alarm mechanism that can be placed up to 100 feet away from the tank and is battery operated;]
a first sensor that senses through a wall of the tank;
a monitoring device operably connected to the sensor and positioned within the housing and includes software to allow for *at least one of*:
self-calibration and automatically determining the sensitivity of the sensor depending on variables in the tank,
operator inputs to the unit,
detection of time between softening cycles to reduce unit energy consumption, and
detection of a dirty tank condition.

2. The salt sensing unit of 1, further comprising:
an infrared wave source operably connected to the monitoring device; and
a second sensor mounted on an opposite side of the tank and operably connected to the monitoring device.

3. The unit of claim 1 wherein the first sensor is a position based sensor.

4. A unit of claim 1 wherein the first sensor is at least one of: an induction-based detection mechanism that detects the inductance of the substance, and a capacitance-based detection mechanism that detects the capacitance of the substance.

5. The unit of claim 1, further comprising a container attachment means operably connected to the housing that includes at least one of: an adhesive, tabs having double sided tape, hook and loop fasteners, tabs having a protruding male member and a receiving female member, and a shaft fastened to the container.

6. The unit of claim 1, wherein the sensor further includes a chip that is operably connected to software for determining a threshold for a substance within the tank.

7. The unit of claim 1, wherein the software further detects peaks and valleys in a capacitance of a substance within the tank.

8. The unit of claim 1, wherein the software further includes a timer that operates the sensor at intervals.

9. The unit of claim 1 wherein the sensor is a calibration mechanism that works with the sensor to obtain a lower limit capacitance value based on chemical processes within the water softener tank.

10. The unit of claim 1 wherein the sensor is a capacitance-based detection mechanism and further includes a chip for analyzing a stored lower limit capacitance value of a brine substance relative to an actual capacitance value of a chemical process within the water softener tank.

11. The unit of claim 1, further comprising a second sensor operably connected to the first sensor, and wherein the second sensor operates independently from the first sensor to act as a variable gauge.

12. The unit of claim 11, wherein at least one sensor is a capacitive strip mounted on the tank.

13. The unit of claim 1, further comprising a battery set inside the housing.

14. The unit of claim 1, *further comprising a low level alarm mechanism that can be placed up to 100 feet away from*

*the tank and is battery operated, and* wherein the first sensor detects a solid material and an aqueous material within the tank; and the alarm mechanism remotely receives a signal from the sensor and promulgates an alert.

15. The unit of claim 1, *further comprising a low level alarm mechanism that can be placed up to 100 feet away from the tank and is battery operated, and* wherein the alarm mechanism is located remotely from the sensor and wherein the sensor wirelessly transmits to the [signaler] *alarm mechanism*.

16. A salt sensing unit for a water softener tank comprising:

a first housing enclosure that connects to the outside of the tank and is configured to mount to any shape and size of tank;

[a low level alarm mechanism that can be placed up to 100 feet away from the tank and powered by a battery or electrical outlet;]

a first sensor that senses through a wall of the tank;

a monitoring device operably connected to the sensor and positioned within the housing and includes software to allow for *at least one of*:

self-calibration and automatically determining the sensitivity of the sensor on the tank, operator inputs to the unit, detection of time between softening cycles to reduce unit energy consumption, and detection of a dirty tank condition.

17. A salt sensing unit for a water softener tank comprising:

a first housing enclosure that connects to the outside of the tank;

[a low level alarm mechanism remote from the tank;]

a first sensor that senses through a wall of the tank;

a monitoring device operably connected to the sensor and positioned within the housing and includes software to allow for *at least one of*:

self-calibration and automatically determining the sensitivity of the sensor on the tank, and detection of time between softening cycles to reduce unit energy consumption.

* * * * *